US012718319B2

(12) United States Patent
Gelra et al.

(10) Patent No.: US 12,718,319 B2
(45) Date of Patent: Aug. 25, 2026

(54) DEEP LEARNING BASED COPYING AND PASTING OF TRANSPARENT OBJECTS

(71) Applicant: Adobe Inc., San Jose, CA (US)

(72) Inventors: Praveen Gelra, Noida (IN); Ashish Anand, Noida (IN); Ansh Gupta, New Delhi (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 586 days.

(21) Appl. No.: 18/176,230

(22) Filed: Feb. 28, 2023

(65) Prior Publication Data

US 2024/0289965 A1 Aug. 29, 2024

(51) Int. Cl.

| | |
|---|---|
| ***G06T 7/194*** | (2017.01) |
| ***G06N 3/0455*** | (2023.01) |
| ***G06T 7/11*** | (2017.01) |
| ***G06T 11/60*** | (2006.01) |

(52) U.S. Cl.

CPC .......... *G06T 7/194* (2017.01); *G06N 3/0455* (2023.01); *G06T 7/11* (2017.01); *G06T 11/60* (2013.01); *G06T 2207/20084* (2013.01)

(58) Field of Classification Search

CPC ... G06T 7/10; G06T 7/11; G06T 7/194; G06T 2207/20081; G06T 2207/20084; G06T 11/60; G06N 3/02–0985; G06N 3/0455; G06N 3/045

See application file for complete search history.

(56) References Cited

U.S. PATENT DOCUMENTS

| | | | | |
|---|---|---|---|---|
| 2018/0121768 A1* | 5/2018 | Lin | .......... | G06N 3/09 |
| 2018/0359416 A1* | 12/2018 | Hold-Geoffroy | .... | H04N 23/667 |
| 2019/0114774 A1* | 4/2019 | Zhang | .......... | G06N 3/08 |
| 2019/0147305 A1* | 5/2019 | Lu | .......... | G06V 10/454 382/157 |
| 2020/0134834 A1* | 4/2020 | Pao | .......... | G06T 7/11 |

OTHER PUBLICATIONS

Chen, Guanying, Kai Han, and Kwan-Yee K. Wong. "Learning transparent object matting." International Journal of Computer Vision 127.10 (2019): 1527-1544. (Year: 2019).*

(Continued)

*Primary Examiner* — Geoffrey E Summers

(74) *Attorney, Agent, or Firm* — Keller Preece PLLC

(57) ABSTRACT

The present disclosure relates to systems, methods, and non-transitory computer-readable media that generate a modified digital image depicting a transparent object utilizing a transparency properties neural network. For example, the disclosed system accesses a trimap for a source digital image depicting a transparent object. The disclosed system utilizes the trimap of the source digital image and the source digital image to generate an alpha matte and a refractive flow. Specifically, the disclosed system generates the alpha matte and refractive flow by utilizing a transparency properties neural network. Furthermore, the disclosed system generates the modified digital image depicting the transparent object (from the source digital image) within a background of a target digital image, by modifying a portion of the background of a target digital image behind the transparent object utilizing the alpha matte and the refractive flow.

20 Claims, 15 Drawing Sheets

(56) References Cited

OTHER PUBLICATIONS

"Dual, Adj. & N." Oxford English Dictionary, Oxford UP, Mar. 2025, https://doi.org/10.1093/OED/8831412162. (Year: 2025).*
Cai, Huanqia, et al. "Transmatting: Enhancing transparent objects matting with transformers." European conference on computer vision. Cham: Springer Nature Switzerland, 2022. (Year: 2022).*
Hang, Zicun, and Yee-Hong Yang. "Learning super-resolution of environment matting of transparent objects from a single image." IEEE Access 10 (2022): 3548-3558. (Year: 2022).*
Xie, Enze, et al. "Segmenting transparent objects in the wild." European conference on computer vision. Cham: Springer International Publishing, 2020. (Year: 2020).*
Recycleye; "A Generative Adversarial Network (GAN) to Generate Transparent Objects"; Retrieved from the Internet: URL: https://recycleye.com/wastenet-generative-adversarial-network/.

* cited by examiner

Modify Parameters 620
Alpha Prediction Loss 616
Refractive Flow Prediction Loss 618
Modify Parameters 622
Alpha Matte 612
Refractive Flow 614
Transparency Properties Neural Network 610
First Decoder Branch 606
Second Decoder Branch 608
Encoder 604
Digital Image 600
Trimap 602

DEEP LEARNING BASED COPYING AND PASTING OF TRANSPARENT OBJECTS

BACKGROUND

Recent years have seen significant advancement in hardware and software platforms for enabling client devices to modify digital images. For example, many image editing platforms offer various tools to modify or enhance digital images. Accordingly, client devices via image editing platforms are able to modify digital images to depict new elements. For instance, often in the field of digital image editing, users of client devices seek to copy and paste a portion of a digital image to move the portion to another digital image. However, despite these advancements, digital image editing continues to suffer from a variety of problems with regard to copying and pasting of transparent objects, including inefficiency of utilizing computing resources, inaccuracy in editing digital images, and functional inflexibility.

SUMMARY

One or more embodiments described herein provide benefits and/or solve one or more of the problems in the art with systems, methods, and non-transitory computer-readable media that implements a deep-learning neural network for copying and pasting transparent objects within a digital image. For example, the disclosed system extract and process transparent objects from a source digital image (e.g., a first digital image) for copying and pasting into a target digital image (e.g., a second digital image). In doing so, the disclosed system maintains realistic transparent and refractive properties when pasting transparent objects into target digital images. Specifically, the disclosed system utilizes the deep-learning neural network to generate an alpha matte and refractive flow for transparent object(s) within the source digital image. Furthermore, the disclosed system warps the background of the target digital image based on the refractive flow and composites the warped background with the transparent object (modified by the alpha matte) to generate a modified digital image.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
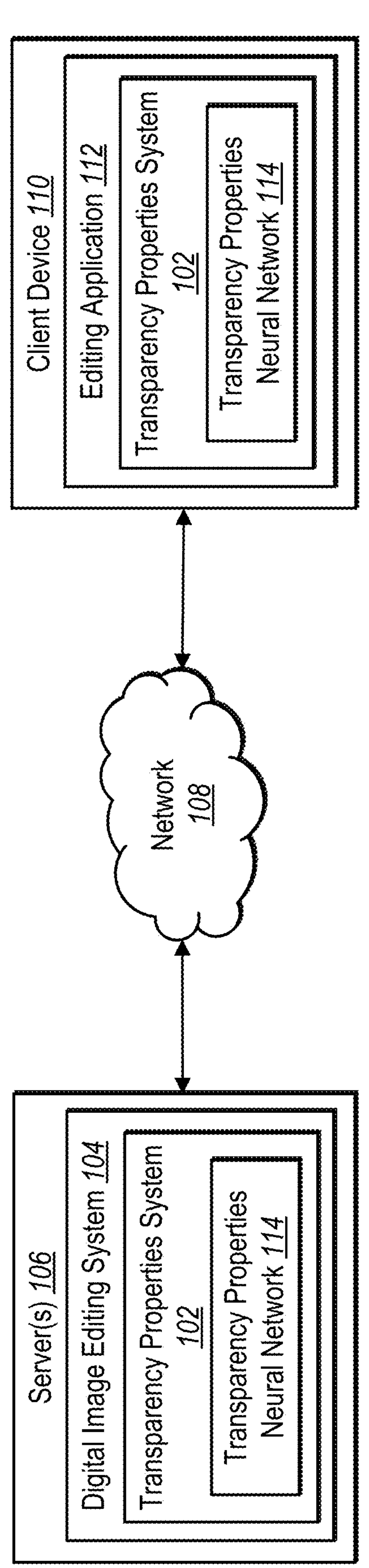
FIG. 1 illustrates an example environment in which a transparency properties system operates in accordance with one or more embodiments.

One or more embodiments described herein include a method, systems, and non-transitory computer readable medium for generating a modified digital image showing a transparent object from a source digital image (e.g., a first digital image) on a background of a target digital image (e.g., a second digital image). Further, the transparency properties system generates the modified digital image by utilizing an alpha matte and refractive flow. For example, the transparency properties system extracts a transparent object from a source digital image and places the transparent object over a background of a target digital image. In particular, the transparency properties system preserves the transparent and refractive properties of the transparent object when pasting onto the background of the target digital image. Specifically, the transparency properties system realistically and naturally depicts the transparent and refractive properties by modifying a portion of the background of a target digital image behind the transparent object utilizing the refractive flow. Furthermore, the transparency properties system generates the alpha matte and refractive flow utilizing a transparency properties neural network.

As just mentioned, the transparency properties system utilizes the transparency properties neural network to generate the alpha matte and refractive flow. In one or more embodiments, the architecture of the transparency properties neural network includes encoder and decoder layers. In particular, the transparency properties system utilizes an encoder of the transparency properties neural network to generate one or more features maps. For instance, the transparency properties system generates the features map(s) from a combination of the source digital image and a trimap of the source digital image.

In one or more embodiments, the transparency properties neural network includes a dual-head decoder. For example, the architecture of the transparency properties neural network includes two decoder branches for generating the aforementioned alpha matte and refractive flow. In particular, in one or more embodiments, a first branch of the decoder generates the alpha matte and a second branch of the decoder generates the refractive flow. As discussed later, the dual-head decoder conserves time and computational resources.

As just mentioned, the transparency properties system generates the alpha matte via the transparency properties neural network. For example, the transparency properties system, via the transparency properties neural network, generates the alpha matte by decoding the features map generated from the combination of the source digital image and a trimap of the source digital image. In generating the alpha matte, the transparency properties system determines transparency properties of the transparent object depicted in the source digital image. By determining the transparent properties of the depicted transparent object, the transparency properties system is able to preserve those properties within a background of a target digital image.

As also mentioned above, the transparency properties system generates the refractive flow via the transparency properties neural network. As an example, the transparency properties neural network generates the refractive flow with two channels that indicate the horizontal and vertical refractive flow. In particular, the refractive flow indicates to the transparency properties system the displacement of pixels within the background of a target digital image. Furthermore, the transparency properties system scales the refractive flow based on a dimension of the background of a target digital image. Moreover, by utilizing the scaled refractive flow, the transparency properties system generates a warped background.

The transparency properties system generates a modified digital image comprising the transparent object from the source digital image and the background from the target digital image. Specifically, the transparency properties system composites the warped background with the transparent object depicted in the source digital image. For instance, the transparency properties system modifies the transparent object depicted in the source digital image by utilizing the alpha matte and composites the modified transparent object with the warped background. In utilizing this method, the transparency properties system, via the transparency properties neural network generates, a natural and realistic depiction of the transparent object over a background of a target digital image. In particular, the transparency properties system preserves the transparency and refractive properties of the transparent object depicted in the source image and transmutes those properties to the background of a target digital image.

As mentioned previously, conventional systems suffer from inefficiency of utilizing computing resources, inaccuracy in editing digital images, and functional inflexibility. For example, on various image editing platforms, extensive manual editing is generally required. In particular, for copying a transparent object from a source digital image to place over a background of a target digital image, extensive technical editing skills and manual refinement is required to attempt to generate a realistic looking digital image. Accordingly, novice users of image editing applications typically must consult tutorial videos to learn the numerous manual steps required to copy and paste transparent objects to a background of a target digital image. Even after extensive technical editing and manual refinements, the background of a target digital image depicting the copied transparent object often appears unrealistic and unnatural.

As just mentioned, transparent objects copied from a source digital image to a background of a target digital image utilizing conventional systems often appear unnatural. In particular, the unnatural appearance of the transparent object over a background of a target digital image is generally due to conventional systems failing to adopt the transparent and refractive properties. Specifically, conventional systems typically fail to translate the transparent and refractive properties of the transparent object in the digital image to the background of a target digital image. For instance, the background of a target digital image fails to depict the transparent object naturally refracting light. Accordingly, conventional systems suffer from issues of inaccuracy. Moreover, some conventional systems attempt to utilize machine learning to predict the appearance of transparent objects. However, these conventional systems still fail to accurately reflect the refractive properties that would naturally be present due to the existence of transparent objects. Thus, conventional systems also suffer from issues of inflexible functionality.

The transparency properties system provides several advantages over conventional systems. For example, the transparency properties system operates more efficiently than conventional systems. In particular, the transparency properties system generates a modified digital image depicting a transparent object from a source digital image over the background of a target digital image. For instance, as mentioned above, the transparency properties system generates the alpha matte and the refractive flow by utilizing a combination of the source digital image and a trimap of the source digital image. In doing so, the transparency properties system maintains the transparent and refractive properties of the depicted transparent object in the background of a target digital image. Furthermore, the transparency properties system does not require manual editing and extensive technical editing skills, rather the transparency properties system utilizes the deep-learning transparency properties neural network to generate the modified digital image with the transparent object. As such, even novice users are able to copy and paste transparent objects to a background of a target digital image while maintaining a realistic and natural appearance.

Furthermore, as also mentioned above, the transparency properties system utilizes the transparency properties neural network with a dual-head decoder. Specifically, a branch of the dual-head decoder generates the alpha matte and another branch of the dual-head decoder generates the refractive flow. By utilizing a dual-head decoder (for the transparency properties neural network), the transparency properties system improves upon efficiency as compared to conventional systems. For instance, the transparency properties neural network generates both the alpha matte and the refractive flow, and as a result conserves both time and computational resources. In particular, the transparency properties neural network conserves computational resources by generating both the alpha matte and the refractive flow utilizing the same encoder. Furthermore, the transparency properties neural network conserves time by only training a single neural network that generates both the alpha matte and the refractive flow.

Moreover, the transparency properties system improves efficiency by simplifying the graphical user interface workflow. For example, the transparency properties system provides an intuitive interface for selecting a digital image with a transparent object, a background of a target digital image, and a trimap. In doing so, the transparency properties system reduces the number of interfaces utilized by a user and efficiently provides a modified digital image with the transparent object.

In addition to the efficiency improvements, the transparency properties system also improves upon accuracy. For example, the transparency properties system improves upon accuracy by generating both the alpha matte and refractive flow. Specifically, the transparency properties system utilizes the alpha matte and the refractive flow to maintain accurate and realistic depictions of the transparent object over a background of a target digital image.

Further, in addition to the efficiency and accuracy improvements, the transparency properties system also improves upon functional flexibility. For example, the transparency properties system generates both the alpha matte and the refractive flow from the source digital image and a trimap of the source digital image. By utilizing both the alpha matte and the refractive flow, the transparency properties system provides for an adjustable scaled refraction within the background of a target digital image and an accurate portrayal of the transparency. Accordingly, the transparency properties system includes improvements over functional flexibility by utilizing both the alpha matte and the refractive flow.

Additional detail regarding the transparency properties system will now be provided with reference to the figures. For example, FIG. 1 illustrates a schematic diagram of an exemplary system environment 100 in which the transparency properties system 102 operates. As illustrated in FIG. 1, the system environment 100 includes a server(s) 106, a digital image editing system 104, a network 108, a client device 110, an editing application 112 and a transparency properties neural network 114.

Although the system environment 100 of FIG. 1 is depicted as having a particular number of components, the system environment 100 is capable of having any number of additional or alternative components (e.g., any number of servers, client devices, or other components in communication with the transparency properties system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 11). Moreover, the server(s) 106 and the client device 110 include one or more of a variety of computing devices (including one or more computing devices as discussed in greater detail with relation to FIG. 11).

As mentioned above, the system environment 100 includes the server(s) 106. In one or more embodiments, the server(s) 106 receives digital images, trimaps of digital images, and generates modified digital images depicting transparent objects. In one or more embodiments, the server(s) 106 comprises a data server. In some implementations, the server(s) 106 comprises a communication server or a web-hosting server.

In one or more embodiments, the client device 110 includes computing devices that are able to edit, modify, convert, and/or provide, for display, digital images on the editing application 112. For example, the client device 110 includes smartphones, tablets, desktop computers, laptop computers, head-mounted-display devices, or other electronic devices. The client device 110 includes one or more applications (e.g., a digital image capture application) for capturing digital images in accordance with the digital image editing system 104. For example, in one or more embodiments, the digital image capture application works in tandem with the digital image editing system 104 to capture digital images and provide tools for editing of the digital images. In particular, the digital image capture application and the editing application 112 includes a software application installed on the client device 110. Additionally, or alternatively, the digital image capture application and the editing application 112 includes a software application hosted on the server(s) 106 which may be accessed by the client device 110 through another application, such as a web browser.

To provide an example implementation, in some embodiments, the transparency properties system 102 on the server(s) 106 supports the transparency properties system 102 on the client device 110. For instance, in some cases, the digital image editing system 104 on the server(s) 106 gathers data for the transparency properties system 102. The transparency properties system 102 then, via the server(s) 106, provides the information to the client device 110. In other words, the client device 110 obtains (e.g., downloads) the transparency properties system 102 from the server(s) 106. Once downloaded, the transparency properties system 102 on the client device 110 generates a modified digital image with a transparent object. Furthermore, FIG. 1 shows the transparency properties neural network 114 as a sub-component of the transparency properties system 102 on both the client device 110 and the server(s) 106.

In alternative implementations, the transparency properties system 102 includes a web hosting application that allows the client device 110 to interact with content and services hosted on the server(s) 106. To illustrate, in one or more implementations, the client device 110 accesses a software application supported by the server(s) 106. In response, the transparency properties system 102 on the server(s) 106, generates and provides a modified digital image. The server(s) 106 then provides the modified digital image to the client device 110 for display.

To illustrate, in some cases, the transparency properties system 102 on the client device 110 receives/captures digital images. The client device 110 transmits the digital images to the server(s) 106. In response, the transparency properties system 102 on the server(s) 106 generates a modified digital image with a transparent object from a first digital image and a background from a second digital image. The transparency properties system 102 on the server(s) 106 then transmits the modified digital image back to the client device 110.

Indeed, the transparency properties system 102 is able to be implemented in whole, or in part, by the individual elements of the system environment 100. For instance, although FIG. 1 illustrates the transparency properties system 102 implemented with regard to the server(s) 106, different components of the transparency properties system 102 are able to be implemented by a variety of devices within the system environment 100. For example, one or more (or all) components of the transparency properties system 102 are implemented by a different computing device (e.g., the client device 110) or a separate server from the server(s) 106. Indeed, as shown in FIG. 1, the client device 110 includes the transparency properties system 102. Example components of the transparency properties system 102 will be described below with regard to FIG. 8.

As mentioned above, the transparency properties system 102 generates a modified digital image depicting a transparent object from a source digital image over a background of a target digital image while maintaining the transparent and refractive properties of the transparent object within the background of the target digital image. As also discussed above, and in contrast to the transparency properties system 102, prior systems often fail to maintain the transparent and refractive properties of a transparent object over a background of a target digital image. As illustrated, FIGS. 2A-2B show some results from prior systems copying and pasting a transparent object over a background of a target digital image.

Figures 2A, 2B:
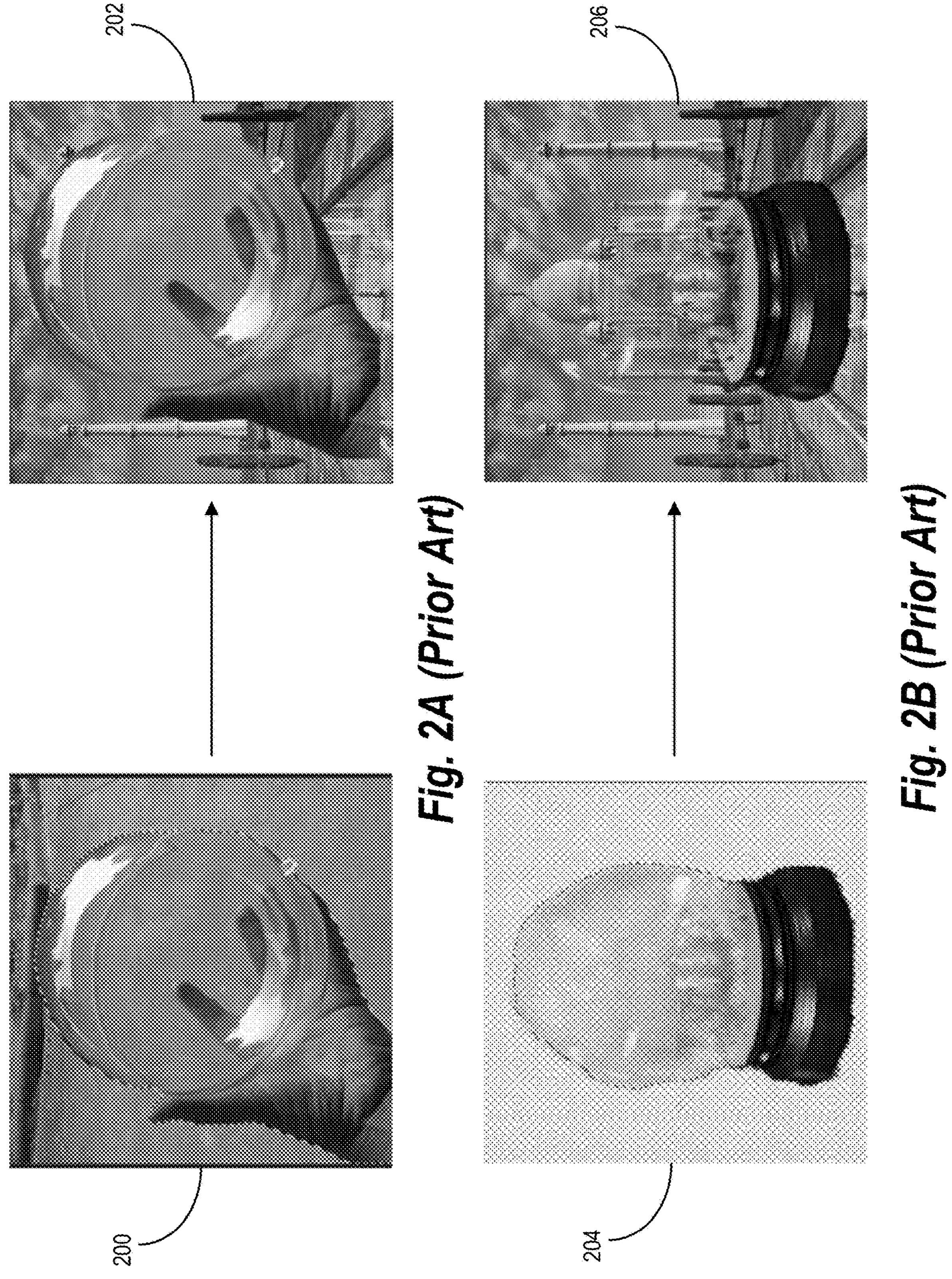
FIGS. 2A-2B illustrates an overview of prior systems generating a digital image with a transparent object in accordance with one or more embodiments.

As illustrated, FIG. 2A shows a digital image 200 depicting a hand holding a globe object. For example, the digital image 200 shows the globe object as possessing transparent and refractive properties. Due to the transparent and refractive properties of the globe object, the digital image 200 shows the background through the globe object warped according to the refractive properties. In particular, FIG. 2A also shows an outline surrounding the hand holding the globe object to indicate a user of a client device copying the object. For instance, in prior systems, a method for copying an object typically includes using a editing tool to select a portion of the digital image 200 for copying.

Furthermore, after selecting the hand holding the globe object as depicted in digital image 200, a user of prior systems copies the hand holding the globe object and pastes the object within a second digital image 202. As shown in FIG. 2A, the hand holding the globe object is pasted over the second digital image 202 depicting the Taj Mahal. Because the hand holding the globe object exhibits transparent and refractive properties (e.g., the object is not opaque), the second digital image 202 shows an unrealistic and unnatural depiction of the object. Specifically, the second digital image 202 is unrealistic and unnatural because prior systems fail to maintain the transparent and refractive properties from the digital image 200. For instance, the hand holding the globe object in the second digital image 202 fails to accurately and naturally depict deflected light waves passing through the globe. Furthermore, the globe object fails to manifest transparency. To illustrate, the second digital image 202 shows the hand holding the globe object, however the globe object still shows the background from the digital image 200. Namely, in the digital image 200, the background shows a grey cement ground. When prior systems paste the hand holding the globe object into the second digital image 202, prior systems fail to incorporate the correct transparent properties (e.g., the second digital image 202 should show the Taj Mahal behind the transparent globe object). Accordingly, FIG. 2A illustrates the failure of prior systems to effectively generate accurate, natural, and realistic modified images depicting transparent objects.

In addition to the illustration shown in FIG. 2A, FIG. 2B also shows the deficiencies of prior systems. For example, FIG. 2B also shows a globe object in digital image 204. Specifically, FIG. 2B shows the globe object as also possessing transparent and refractive properties. Furthermore, FIG. 2B shows the digital image 204 with the globe object and the background removed. The outline surrounding the globe object in the digital image 204 also indicates a user of the prior systems copying the globe object. For instance, FIG. 2B illustrates the user of prior systems copying and pasting the globe object from the digital image 204 to a second digital image 206.

Moreover, FIG. 2B illustrates the second digital image 206 depicting the globe object from the digital image 204 with the transparency from the digital image 204 transferred to the second digital image 206. Specifically, as compared to FIG. 2A, the prior system in FIG. 2B shows the globe object in the second digital image 206 with transparent properties. As such, the second digital image 206 depicts the Taj Mahal behind the globe object due to the transfer of transparent properties from the digital image 204 to the second digital image 206. However, despite the second digital image 206 showing transparent properties of the globe object, the second digital image 206 fails to accurately and naturally depict the refractive properties from the transparency of the globe object. Specifically, the second digital image 206 fails to show the deflection and bending of light passing through the globe object. Furthermore, the Taj Mahal as the background shows no indication of distortion from the transparent object as the foreground. Accordingly, despite FIG. 2B illustrating transparency of the globe object within the second digital image 206, FIG. 2B illustrates the failure of prior systems to maintain natural, realistic, and accurate depictions of transparent and refractive properties.

Figure 2C:
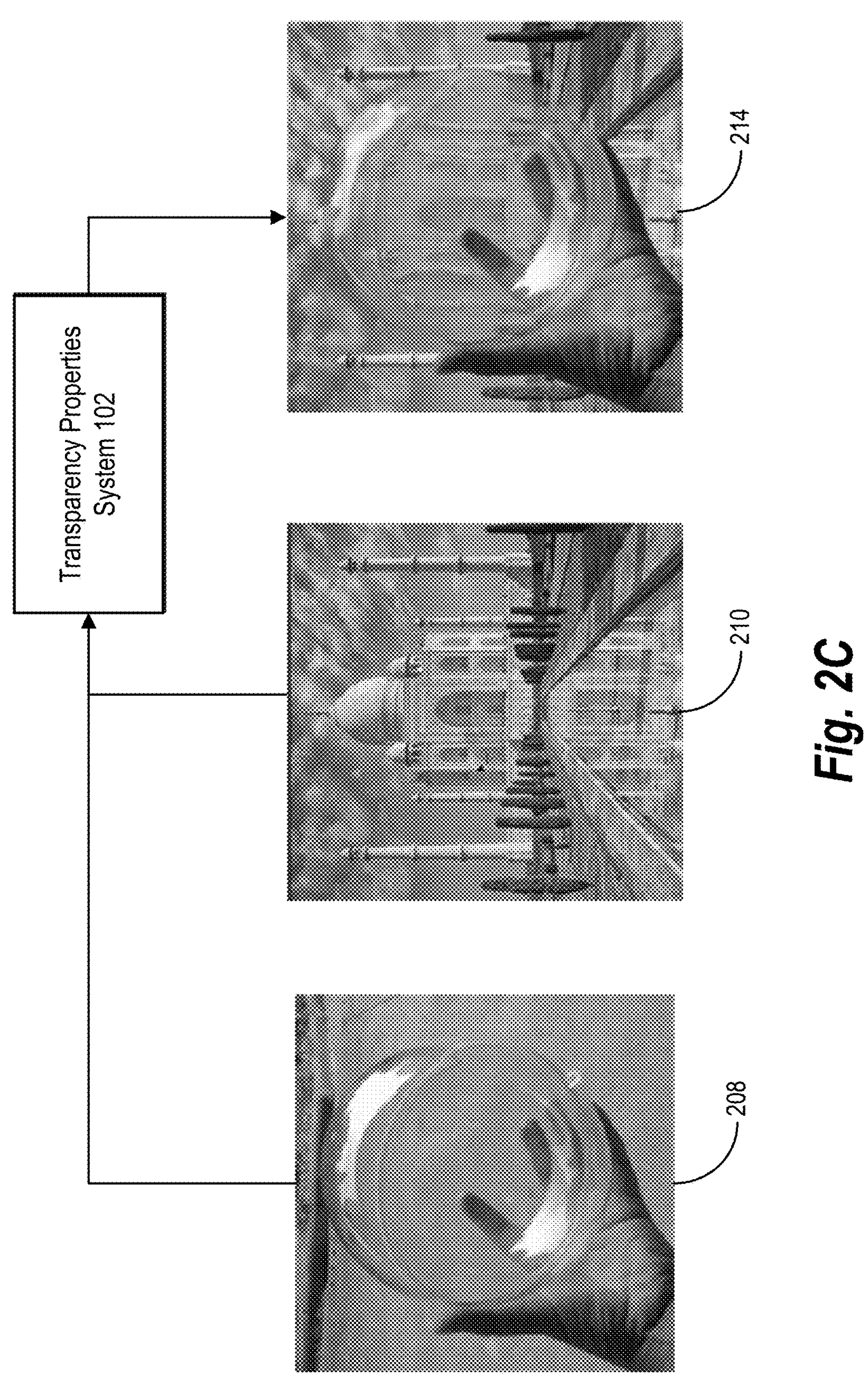
FIG. 2C illustrates an overview of the transparency properties system generating a modified digital image depicting a transparent object in accordance with one or more embodiments.

As mentioned above, FIGS. 2A-2B illustrate the deficiencies of prior systems. In contrast, FIG. 2C illustrates the improvement of the transparency properties system 102 over prior systems. For example, FIG. 2C illustrates a first digital image 208 depicting the hand holding the transparent object. As just mentioned, the transparency properties system 102 receives the first digital image 208 and the second digital image 210. For example, a digital image includes a digital frame composed of various pictorial elements. In particular, the pictorial elements include pixel values that define the spatial and visual aspects of the digital image. Furthermore, the transparency properties system 102 receives digital images from various image editing platforms. In other instances, the transparency properties system 102 captures a digital image by utilizing a digital capture application. For instance, the digital capture application receives a digital image stream at predetermined intervals, and capturing a digital image includes capturing a frame from the digital image stream that shows multiple frames.

As also mentioned above, the transparency properties system 102 receives the first digital image 208 depicting a globe object. For example, an object includes a collection of pixels in a digital image that depicts a person, place, or thing. To illustrate, in some embodiments, an object includes a person, an item, a natural object (e.g., a tree or rock formation) or a structure depicted in a digital image. In some instances, an object refers to a plurality of elements that, collectively, can be distinguished from other elements depicted in a digital image. For example, in some instances, an object includes a collection of buildings that make up a skyline. In some instances, an object more broadly includes a (portion of a) foreground or other element(s) depicted in a digital image as distinguished from a background.

Furthermore, in addition to the discussion above regarding the object, a transparent object includes an object with properties that allow light to pass through the object. In one or more embodiments, the transparent object includes translucent properties, namely allowing for some light to pass through the object (e.g., semi-transparent). Moreover, the transparent object includes other properties such as refraction. For example, refraction includes the deflection or bending of light waves as the light waves pass through one medium to another. For instance, refraction in the context of transparent objects includes light in the digital image passing through the transparent object and the light being deflected or bended in a manner that conforms with the density and transparency of the object. Specifically, a refractive index of the transparent object typically determines the amount of deflection or bending of light waves as the light waves pass through the transparent object.

As illustrated, FIG. 2C shows the transparency properties system 102 receiving the first digital image 208 and the second digital image 210. As shown, the transparency properties system 102 generates a modified digital image 214 from the first digital image 208 depicting the transparent object and the second digital image 210. For example, the modified digital image 214 includes any change, alteration, or enhancement performed to or on a digital image file. To illustrate, the transparency properties system 102 generates the modified digital image 214 by compositing the hand holding the transparent globe object over the background of a target digital image of the Taj Mahal. For instance, FIG. 2C illustrates the modified digital image 214 that depicts the transparent object naturally and accurately over the background of the Taj Mahal.

For example, unlike prior systems, the transparent object does not merely show the background of the first digital image 208 in the modified digital image 214. Moreover, unlike the prior systems, the transparent globe object over the Taj Mahal further shows transparency and refraction (warping) of the Taj Mahal background. More details regarding the transparency properties system 102 is given below in the description of FIGS. 3, 5, and 6. Accordingly, FIG. 2C illustrates the advantages and improvements of the transparency properties system 102 over prior systems in terms of accuracy, efficiency, and flexibility.

Figure 3:
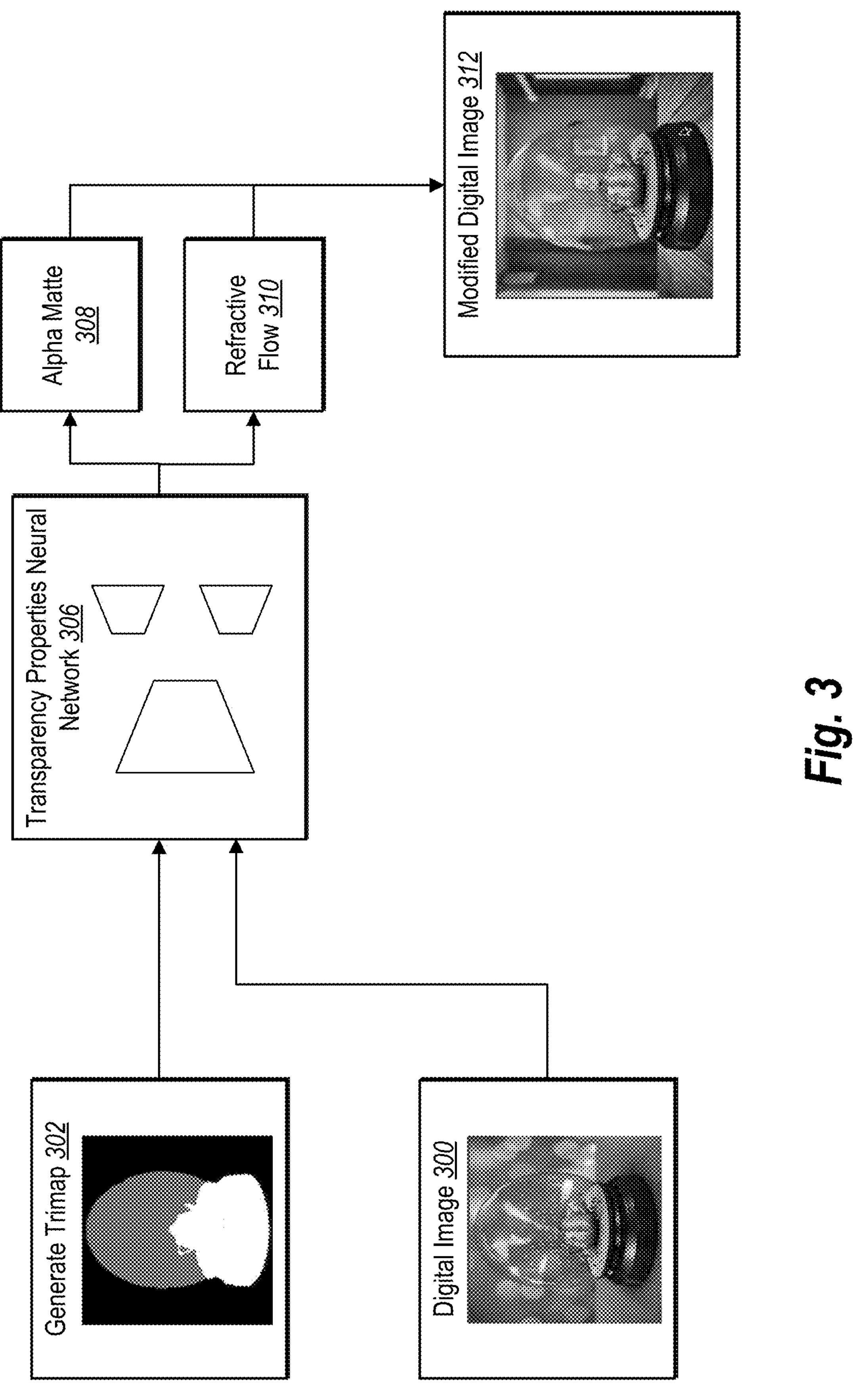
FIG. 3 illustrates a diagram for the transparency properties system generating an alpha matte and refractive flow in accordance with one or more embodiments.

FIG. 3 provides additional details of the transparency properties system 102 generating a modified digital image. As illustrated, FIG. 3 shows the transparency properties system generating or accessing a trimap 302. As discussed above, the transparency properties system 102 utilizes a combination of a digital image 300 (e.g., source digital image) and a trimap 302 of the digital image 300. As discussed above, the trimap 302, in one or more embodiments, includes a three-segment representation of the digital image 300. In particular, each segment of the three-segment representation includes a different category of the digital image 300. For instance, in one or more embodiments, the trimap includes a segment for transparent pixels, a segment for non-transparent pixels, and a segment for background pixels. In some instances, the trimap is represented by black, white, and gray colors. Thus, the trimap utilizes one color to show pixel that are to be copied, another color to indicate pixel that correspond to a transparent object, and yet another color to indicate pixels that will not be used as part of the copying and pasting. More details regarding the act 302 of generating the trimap is given below in the description of FIG. 4.

As further shown, FIG. 3 illustrates the transparency properties neural network 306 utilizing the trimap 302 and the digital image 300 to generate an alpha matte 308 and a refractive a flow 310. In one or more embodiments, a neural network includes a type of machine learning model, which is tunable (e.g., trainable) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components. Accordingly, the transparency properties neural network 306 implements principles of neural networks specifically for generating outputs related to transparency properties.

As also shown, FIG. 3 illustrates, the transparency properties system 102, via the transparency properties neural network 306, generating an alpha matte 308 and a refractive flow 310. The transparency properties system 102 utilizes the alpha matte 308 and the refractive flow 310 in maintaining the transparent and refractive properties of the transparent object within a target digital image (e.g., a modified digital image 312). The alpha matte 308 and the refractive flow 310 both influence the display of pixel values. For example, a pixel value includes an addressable element in an image represented by one or more numerical values. In particular, a pixel value is an element of a picture represented on a display screen and the pixel value describes the brightness of the pixel and a color of the pixel. For example, a pixel includes RGB pixel values between 0 and 255.

As just mentioned, the transparency properties system 102 generates the alpha matte 308. For example, the alpha matte 308 includes a transparency channel. In particular, the transparency properties system 102 utilizes various channels for a pixel value. For instance, for each pixel value, the transparency properties system 102 utilizes an R, G, and a B, channel. In addition, the transparency properties system 102 utilizes an alpha matte channel to determine the level of transparency for a pixel value. Accordingly, the alpha matte 308 indicates transparent properties of pixel values and determines how the transparency properties system 102 renders a pixel value when blended with another pixel value.

As mentioned above, in addition to the transparency properties system 102 generating the alpha matte 308, the transparency properties system 102 also generates the refractive flow 310. As discussed above, transparent objects include properties such as refraction. For example, the refractive flow 310 includes an indication of displacing pixel values to reflect the refractive properties of deflecting and bending light waves as light waves pass through a transparent object. In particular, the refractive flow 310 includes a two-channel vector that includes a horizontal and vertical indication for displacing pixel values. Furthermore, the two-channel vector indicates a refractive map of the horizontal and vertical displacement of pixel values. For instance, the transparency properties system 102 utilizes the refractive flow 310 to generate a warped background. In other words, the transparency properties system 102 remaps pixel values according to the refractive flow, which results in the warped background.

Furthermore, in one or more embodiments, the transparency properties system 102 scales the refractive flow 310 to warp the background of a digital image. In particular, the transparency properties system 102 determines a dimension of the target digital image (e.g., the second digital image). The dimension of the target digital image includes a width of the target digital image. Accordingly, the greater the width value, the greater the magnitude of multiplication for the scaled refractive flow. As such, a greater width value of the target digital image indicates a greater amount of refraction in the modified digital image 312. In other embodiments, the transparency properties system 102 provides a sliding scale to a user of a client device to indicate a magnitude for scaling the refractive flow. This is shown below in FIGS. 7A-7D. Thus, as mentioned above, the transparency properties system 102 remaps pixel values in the target digital image by the values specified in the scaled refractive flow.

In one or more embodiments, the transparency properties system 102 generates the modified digital image 312 by compositing the background of the target digital image (e.g., the second digital image) with the transparent object in the digital image 300. For instance, the transparency properties system 102 utilizes the above-mentioned alpha matte 308 to modify the transparent object shown in the digital image 300 and remaps pixel values within the target digital image by utilizing a scaled refractive flow. The transparency properties system 102 then composites the transparent object modified by the alpha matte with the background warped by the scaled refractive flow to generate the modified digital image 312. For example, compositing includes a process of combining visual elements from separate sources into a single digital image. In particular, the transparency properties system 102 combines the warped background with the transparent object to generate a single digital image.

In one or more embodiments, the transparency properties system 102 performs the compositing of the transparent object with the background of a target digital image by extracting the transparent object and other regions of interest in the digital image 300 with the warped background utilizing a mathematical function. In particular, the transparency properties system 102 determines the remapping of pixel values based on the scaled refractive flow and the alpha matte 308 of the transparent object in the digital image 300 to determine the final composite digital image. To illustrate, in one or more embodiments, the transparency properties system 102 utilizing the following algorithm includes:

$$I = \alpha F + (1 - \alpha)M(R, B)$$

The I represents the final composite digital image. Furthermore, the α represents the alpha matte 308 generated by the transparency properties neural network 306, the F represents the source digital image with the transparent object (e.g., digital image 300), R represents the scaled refractive flow, B represents the background of a target digital image (e.g., the second digital image), and M represents a remapping function to generate the warped background of the target digital image that will show behind the transparent object.

Specifically, the modified digital image 312 depicts the transparent globe object from the digital image 300 over a warped background of a target digital image with the transparent and refractive properties maintained. As discussed above, the alpha matte 308 and the refractive flow 310 assists in the high-quality maintenance of transparent and refractive properties in the modified digital image 312.

In one or more embodiments, the transparency properties system 102 utilizes the techniques shown in FIG. 3 to generate multiple modified digital frames. For instance, the transparency properties system 102 receives a digital video with a transparent object and a new digital video background for placing the transparent object. In particular, the transparency properties system 102 utilizes the transparency properties neural network 306 to generate the alpha matte 308 and the refractive flow 310. By doing so, the transparency properties system 102 generates multiple modified digital frames of the new digital video background by utilizing the alpha matte 308 and the refractive flow 310. As such, the transparency properties system 102, in one or more embodiments, generates modified digital videos for transparent objects while maintaining transparent and refractive properties.

As mentioned above, FIG. 4 discusses various techniques for generating a trimap based on a digital image. Trimaps were previously discussed in the description of FIG. 3, the same principles apply here. For example, the trimap 404 shows three colors: gray, white, and black. In particular, for the illustrated trimap in FIG. 4, the grey color denotes a region of the digital image 400 which includes the transparent object. Specifically, the grey color denotes the region for maintaining transparent and refractive properties in the final digital image (e.g., the modified digital image). In addition, white denotes the region of the digital image 400 to include in the final digital image and black denotes the region of the digital image 400 as not to be included in the final digital image.

Figure 4:
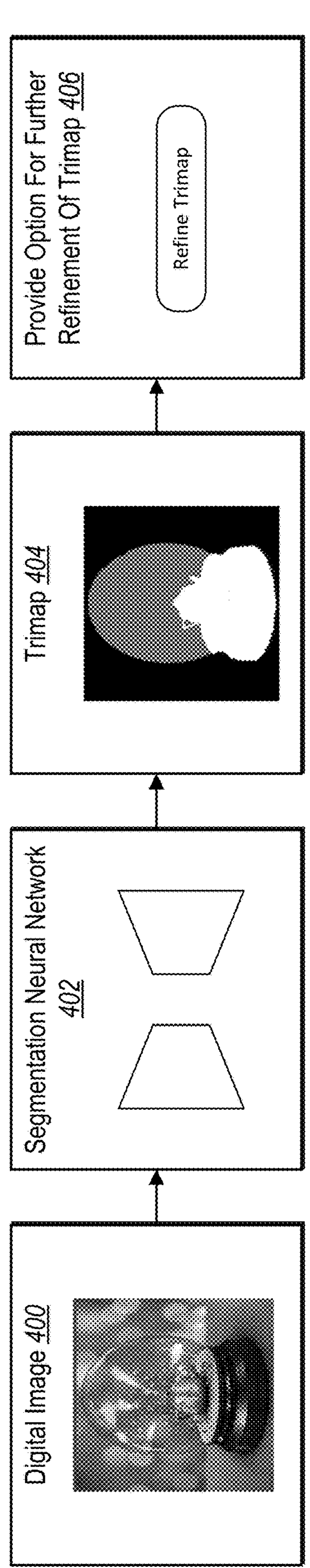
FIG. 4 illustrates a diagram of the transparency properties system generating a trimap in accordance with one or more embodiments.

FIG. 4 illustrates a segmentation neural network 402 generating the trimap from the digital image 400. Neural networks were discussed above. In particular, the segmentation neural network 402 segments the image into various sections such as transparent pixels, non-transparent pixels, and background pixels. To do so, the segmentation neural network receives the digital image 400, generates feature maps from the digital image 400, and identifies different segment categories. For example, the transparency properties system 102 receives the digital image 400 and based on feature maps generated by the segmentation neural network 402, identifies transparent property pixels, non-transparent foreground pixels, and background pixels (e.g., using one hot encoding, an encoding layer, or a vector mapping). Accordingly, the transparency properties system 102, utilizing the segmentation neural network 402, effectively generates trimap representations of the digital image 400.

In addition to the above, FIG. 4 also illustrates the transparency properties system 102 providing an option for further refinement of the trimap. For instance, the generated trimap may include some inaccuracies. As such, the transparency properties system 102 provides options to a user of a client device to refine the trimap. For example, the user may not want to copy all of the non-transparent foreground pixels. As such, the transparency properties system 102 allows the user of the client device to manually select areas to correspond with a different segments of the trimap. Specifically, the transparency properties system 102 provides an editing tool to the user of the client device to select a segment of the trimap (e.g., the segment representing transparent pixel values) and then select other portions of the trimap to include in the selected segment.

Although FIG. 4 illustrates the segmentation neural network 402 generating the trimap, in one or more embodiments, the transparency properties system 102 accesses a trimap manually created by a user. For example, given the digital image 400, the transparency properties system 102 receives an indication to generate a modified digital image depicting a transparent object from the digital image 400. In particular, the transparency properties system 102 provides an option to the user to either utilize the segmentation neural network 402 or to self-select each segment of the trimap within the digital image 400. For instance, in response to the transparency properties system 102 receiving an option to provide an option to self-select each segment of the trimap, the transparency properties system 102 provides an interface with the digital image 400 and a tool to select each segment of the trimap. To illustrate, the transparency properties system 102 provides a tool for the user to indicate a portion of the digital image 400 to assign to a first, second, and third segment. Furthermore, the tool provided to the user to select various portions of the trimap, intelligently adjusts as a selection is performed (e.g., the transparency properties system 102 makes the lines straighter or automatically recognizes different portions of the digital image 400 such as background, foreground, and object as a selection is made).

Moreover, in one or more embodiments, the transparency properties system 102 trains the segmentation neural network 402 specifically for identifying transparent objects. In particular, the transparency properties system 102 utilizes a dataset that includes transparent digital images and opaque digital images. Furthermore, the transparency properties system 102 utilizes datasets that include portions of a digital image that are not transparent but connected to the transparent object (e.g., a hand holding a transparent object). The transparency properties system 102 refines and tunes the segmentation neural network for high quality trimaps by training the segmentation neural network 402 specifically for transparent objects. For instance, the transparency properties system 102 utilizes the segmentation neural network 402 to generate a trimap and compares the trimap to a ground truth trimap. The transparency properties system 102 further determines a measure of loss and back propagates the measure of loss to the segmentation neural network 402. The transparency properties system 102 refines modifies the parameters of the segmentation neural network 402 based on the determined measure of loss.

Figure 5:
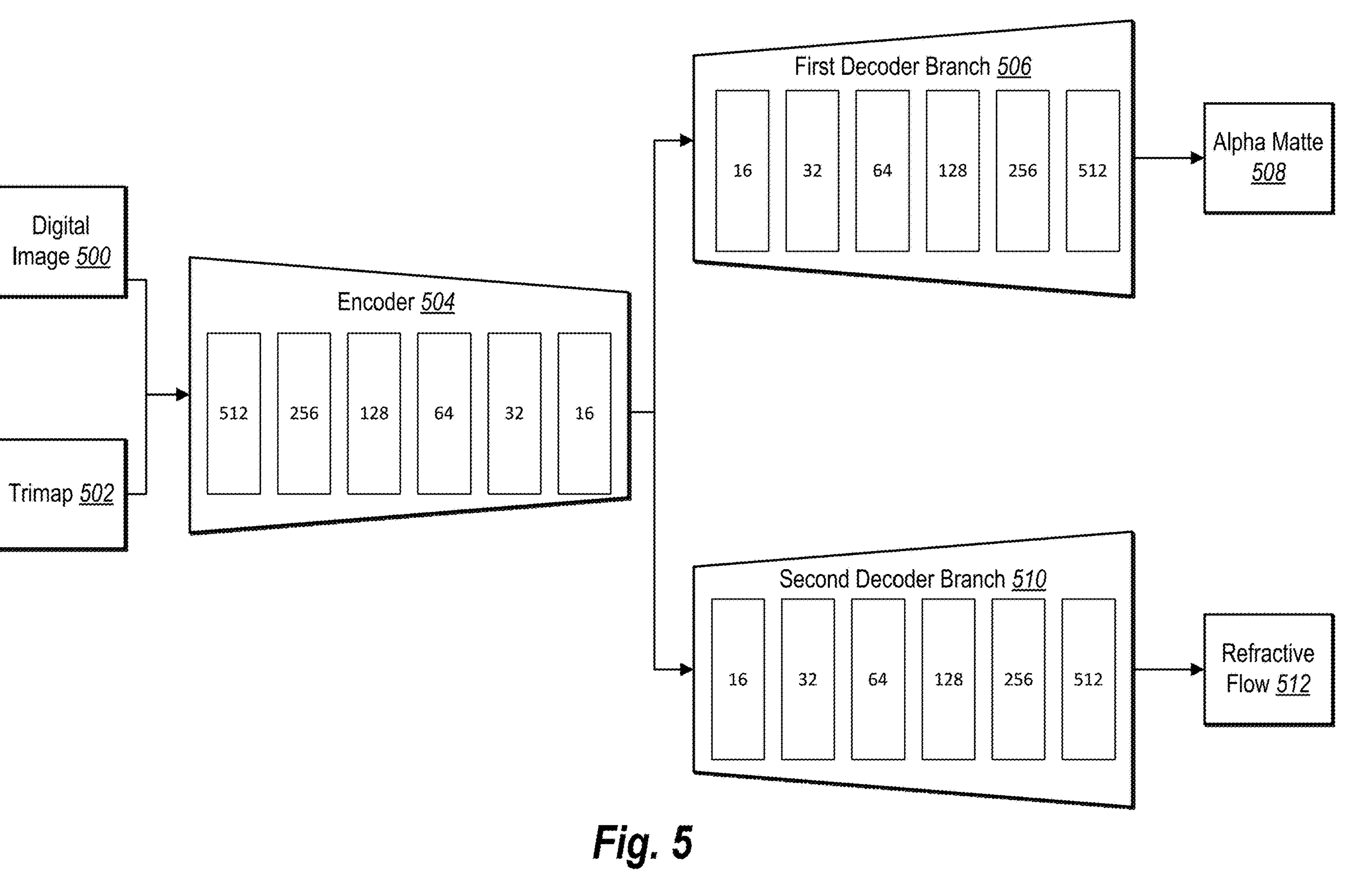
FIG. 5 illustrates a diagram of an architecture of a transparency properties neural network in accordance with one or more embodiments.

As mentioned above, FIG. 5 illustrates the architecture of the transparency properties neural network. For example, the architecture, inputs, and outputs of the transparency properties neural network assists in the various aforementioned improvements over conventional systems. In particular, the transparency properties neural network shown in FIG. 5 includes a deep learning fully convolutional neural network with encoders and decoders. Specifically, FIG. 5 illustrates an encoder 504 receiving a digital image 500 and a trimap 502 as inputs. The trimap 502 and the digital image 500 were similarly discussed above, the same principles apply here. In one or more embodiments, the encoder 504 is a neural network (or one or more layers of a neural network) that extracts features relating to transparent objects within digital images (e.g., in this instance relating to transparent and refractive properties of transparent objects). In some cases, the encoder 504 refers to a neural network that both extracts and encodes features from transparent objects within a digital image. For example, the encoder 504 includes a particular number of layers including one or more fully connected and/or partially connected layers of neurons that identify and represent visible and/or unobservable characteristics of transparent objects.

As shown, FIG. 5 illustrates an encoder 504 with multiple layers. For example, the encoder 504 shows multiple layers such as a 512×512 layer with each subsequent layer reducing by half (256×256, 128×128, 64×64, 32×32, and 16×16). In particular, each layer of the encoder 504 (e.g., 512×512) includes a convolutional, rectified linear unit activation function, and a max pooling function. For instance, the encoder applies to an output of the first layer a rectified linear unit activation function and a max pooling function. Although not illustrated in FIG. 5, the transparency properties neural network includes skip connections from encoder layers to corresponding decoder layers. In particular, these embodiments include skip connections to ensure that the transparency properties system 102 maintains finer details in the initial layers of the encoder 504 as computational outputs reach deeper layers of the transparency properties neural network. For example, skip connections include skipping layers within the neural network and feeding the output from one layer as the input to another layer. In particular, skip connections assist in preventing degradation of features within a digital image. To illustrate, a specific embodiment of the transparency properties neural network includes thirteen layers of a VGG-16 network.

Furthermore, as shown, FIG. 5 illustrates decoders of the transparency properties neural network. In particular, FIG. 5 shows a first decoder branch 506 and a second decoder branch 510. As mentioned above, the architecture design of the transparency properties neural network in utilizing a dual-head decoder decodes information from the encoded feature maps and generates two outputs: an alpha matte 508 and a refractive flow 512. In one or more embodiments, a decoder is a neural network (or one or more layers of a neural network) that converts one or more feature maps input into an output. In particular, the dual-head decoder includes multiple branches, and one of the branches generates the alpha matte 508 output and the other branch generates the refractive flow 512 output. As shown, FIG. 5 illustrates the first decoder branch 506 generating the alpha matte 508 and the second decoder branch 510 generating the refractive flow 512.

In one or more embodiments, the transparency properties neural network includes a different activation layer function for generating the alpha matte 508 and generating the refractive flow 512. In particular the activation layer includes an activation function that defines the type of prediction outputs from a neural network. For instance, the activation layer defines how the transparency properties system 102 transforms the weighted sum of the input to an output. To illustrate, in one or more embodiments, an activation layer includes a sigmoid activation function and a tanh activation function.

In one or more embodiments, the first decoder branch 506 includes a convolutional layer with sigmoid activation as the final layer. In particular, the final layer includes sigmoid activation because the alpha matte 508 includes a weight in the range of 0 to 1. For instance, the alpha matte value of 0 indicates a fully transparent pixel value, whereas an alpha matte value of 1 indicates a fully non-transparent (e.g., opaque) pixel value. Furthermore, the second decoder branch 510 includes a convolutional layer with tanh activation as the final layer. In particular, the final layer of the second decoder branch 510 includes tanh activation because the refractive flow includes a range of −1 to 1. As mentioned above, the refractive flow includes both horizontal and vertical vectors. For the horizontal vector, a −1 refractive flow indicates shifting the pixel values to the left and a +1 refractive flow indicates shifting the pixel values to the right. For the vertical vector, a −1 refractive flow indicates shifting the pixel values downwards and a +1 refractive flow indicates shifting the pixel values upwards. The alpha matte values fall anywhere between 0 and 1 and the refractive flow can also fall anywhere between −1 and 1.

Figure 6:
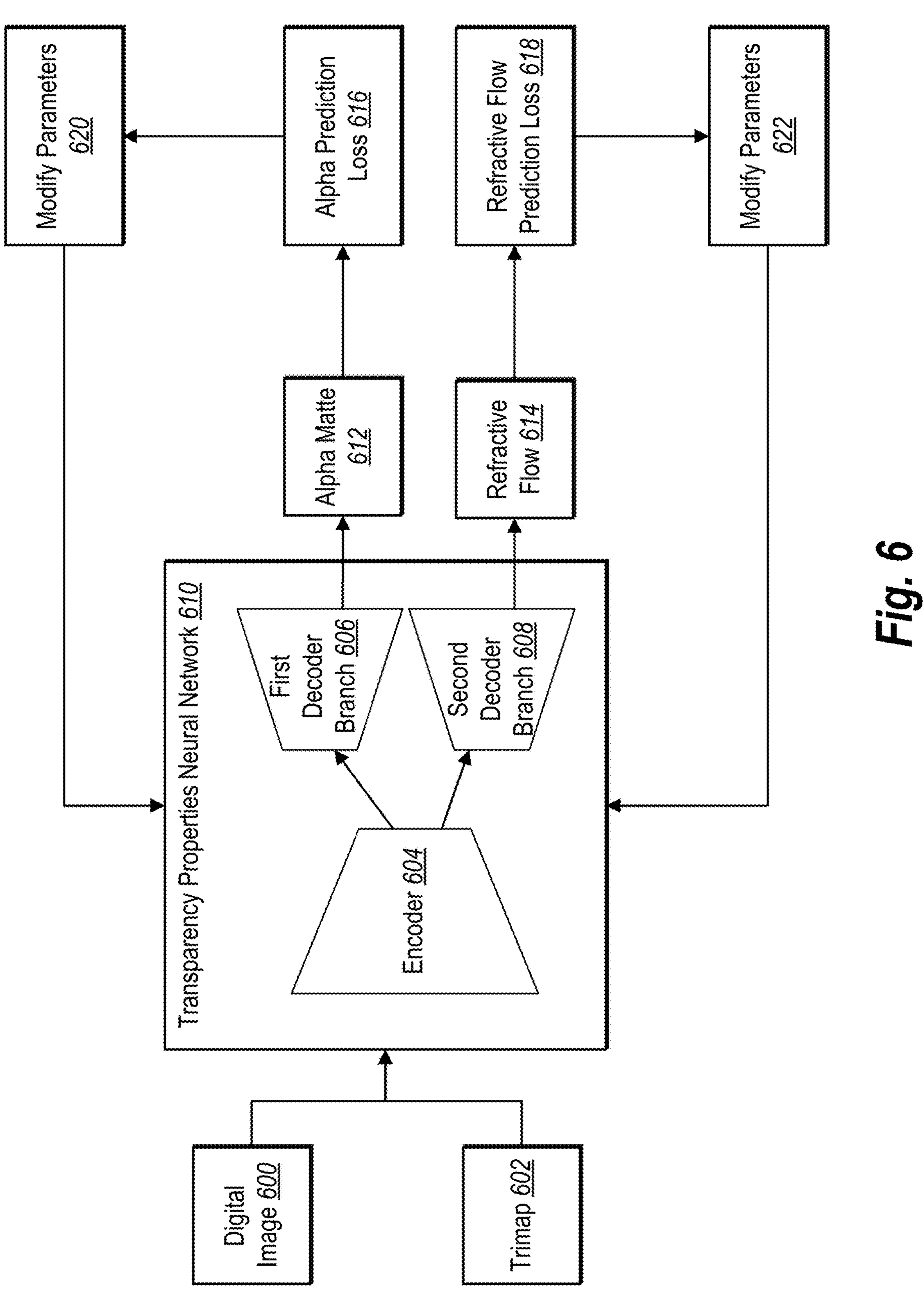
FIG. 6 illustrates a diagram of the transparency properties system training the transparency properties neural network in accordance with one or more embodiments.

As mentioned above, the transparency properties system 102 trains a transparency properties neural network 610. As shown, FIG. 6 illustrates the transparency properties system 102 applying a measure of loss to the transparency properties neural network 610 to adjust the parameters of the model (e.g., perform an act 622 of modifying parameters). For example, as shown, FIG. 6 illustrates the transparency properties neural network 610 receiving a digital image 600 and a trimap 602. The digital image 600 and the trimap 602 were discussed above in relation to FIG. 3, the same principles apply here. Similar to FIG. 3, the transparency properties neural network 610 generates or otherwise accesses the trimap 602 from the digital image 600. Similar to the other figure discussions, FIG. 6 shows the transparency properties neural network 610 receiving the digital image 600 and trimap 602 by an encoder 604 and utilizing a first decoder branch 606 and a second decoder branch 608 to generate an alpha matte 612 and a refractive flow 614.

For training the transparency properties neural network 610, the transparency properties system 102 utilizes loss functions. In one or more embodiments, the loss function includes an L1 (least absolute deviations) loss function, an L2 (least square errors) loss function, a mean squared error loss function, a mean absolute error loss function, a Huber loss function, and/or a cross-entropy loss function.

In addition, FIG. 6 illustrates the transparency properties system 102 performing an act to compare the alpha matte 612 with a ground truth alpha matte and another act to compare the refractive flow 614 to a ground truth reactive flow. In particular, FIG. 6 illustrates the transparency properties system 102 determining an alpha prediction loss 616. Specifically, the alpha prediction loss 616 includes an indication of the difference between the predicted alpha matte (e.g., alpha matte 612) generated by the transparency properties neural network 610 and a ground truth alpha matte value for pixel values within the digital image 600. For instance, the transparency properties system 102 utilizes an algorithm for determining the alpha prediction loss 616. To illustrate, the transparency properties system 102 generates the alpha prediction loss 616 utilizing the following algorithm:

$$L_\alpha = \frac{1}{n}\sum_i (\alpha_p^i - \alpha_g^i)^2$$

In one or more embodiments $L_\alpha$ represents the alpha prediction loss 616, $$\alpha_p^i$$

represents a predicted alpha matte value for an $i^{th}$ pixel within the digital image 600, $$\alpha_g^i$$

represents the ground truth alpha matte value for the $i^{th}$ within the digital image 600, and n represents the total number of pixels in the digital image 600. Accordingly, the alpha prediction loss 616 includes the summation of the difference between the predicted alpha matte value and the ground truth alpha matte value for each pixel within the digital image 600. Furthermore, upon determining the alpha prediction loss 616, the transparency properties system 102 performs an act 620 of modifying parameters of the transparency properties neural network 610 based on the alpha prediction loss 616.

In addition to the alpha prediction loss 616, the transparency properties system 102 also determines a refractive flow prediction loss 618 from the refractive flow 614. In particular, the refractive flow prediction loss 618 includes an indication of the difference between the refractive flow 614 and a ground truth refractive flow. For instance, the transparency properties system 102 also utilizes an algorithm for determining the refractive flow prediction loss 618. To illustrate, in one or more embodiments the transparency properties system 102 generates the refractive flow prediction loss 618 utilizing the following algorithm:

$$L_{fr} = \frac{1}{n}\sum_i \sqrt{(F_{px}^i - F_{gx}^i)^2 + (F_{py}^i - F_{gy}^i)^2}$$

In one or more embodiments, $L_{fr}$ represents the refractive flow prediction loss 618, $$F_{px}^i \text{ and } F_{py}^i$$

represents predicted refractive flow 614 at an $i^{th}$ pixel from the transparency properties neural network 610, and $$F_{gx}^i \text{ and } F_{gy}^i$$

represents the ground truth refractive flow value for the $i^{th}$ pixel. The x and y for each of the corresponding variables corresponds to the horizontal and vertical axis (e.g., x denotes the horizontal axis and y denotes the vertical axis). Accordingly, the refractive flow prediction loss includes a summation of the difference between the horizontal/vertical predicted refractive flow and the horizontal/vertical ground truth for each pixel within the digital image 600.

In one or more embodiments, the transparency properties system 102 utilizes numerous digital images with different types of transparent and semi-transparent objects during training of the transparency properties neural network. In particular, the transparency properties system 102 utilizes corresponding alpha mattes and refractive flows for the different types of transparent and semi-transparent objects. For preparing the dataset, the transparency properties system 102 superimposes the transparent or semi-transparent objects over a background of a target digital image. For each of the transparent or semi-transparent objects in a digital image, the transparency properties system 102 repeats the process with various different background of a target digital images. Moreover, the transparency properties system 102 utilizes a cost function for training the transparency properties neural network 610. In particular, a cost function determines an average of the loss functions over an entire training dataset for optimizing the transparency properties neural network 610. To illustrate, in one or more embodiments, the transparency properties system 102 utilizes the following the cost function:

$$L_{Total} = w_1 L_\alpha + w_2 L_{fr}$$

In one or more embodiments, $w_1$ represents the weight assigned to the alpha prediction loss 616. In particular, the weight $w_1$ includes a value of 1.0. Furthermore, $w_2$ represents the weight assigned to the refractive flow prediction loss 618. In particular, the weight $w_2$ includes a value of 0.1.

Figure 7A:
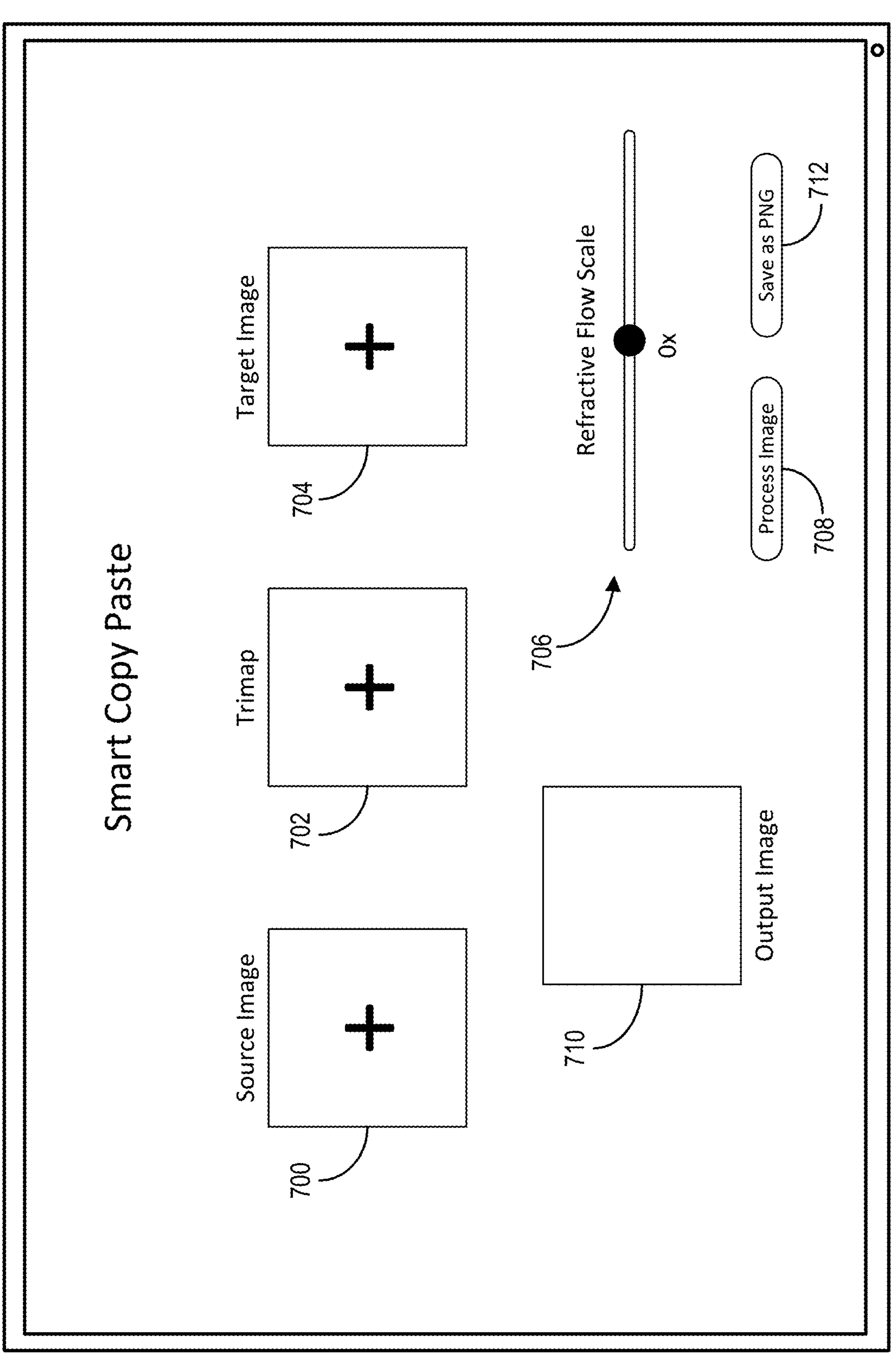
FIGS. 7A-7D illustrates example graphical user interfaces of the transparency properties system generating a modified digital image based on various inputs in accordance with one or more embodiments.

Turning to FIGS. 7A-7D, FIGS. 7A-7D illustrate a graphical user interface workflow for the transparency properties system 102 generating the modified digital image with the transparent object. As mentioned above, the transparency properties system 102 provides a simplified and efficient graphical user interface for a user of a client device to copy and paste a transparent object from one digital image to another. For example, FIG. 7A illustrates a graphical user interface of performing a smart copy and paste. In particular, FIG. 7A shows options to indicate to the transparency properties system 102 a source image 700, a trimap 702, and a target digital image 704. For instance, the graphical user interface shown in FIG. 7A provides the option for a user to upload the source image 700, the trimap 702, and the target digital image 704. After uploading the relevant digital images and the trimap 702, the user of the client device selects process image 708 to generate an output image 710.

Furthermore, in one or more embodiments, transparency properties system 102 provides an option to adjust the refractive flow. The scaled refractive flow was discussed above in relation to the description of FIG. 3. Here, FIG. 7A illustrates the refractive flow scale 706 with a sliding scale. As shown, the refractive flow scale 706 in FIG. 7A depicts Ox, however a user of the client device has an option to adjust the refractive flow scale 706 in the positive or negative direction. In one or more embodiments, adjusting the refractive flow scale 706 multiplies the generated refractive flow by the indicated refractive flow scale 706 (e.g., the transparency properties system 102 scales the refractive flow by a magnitude of the refractive flow scale 706).

As discussed above, the transparency properties system 102 determines the scaled refractive flow by determining a dimension of the background of a target digital image. FIG. 7A illustrates an additional embodiment of the user of the client device adjusting the refractive flow by utilizing the sliding scale. To illustrate, the user of the client device adjusts the sliding scale for the refractive flow scale 706 after the transparency properties system 102 generates the output image 710 or before the transparency properties system 102 generates the output image 710. Moreover, if the user of the client device adjust the refractive flow scale 706 after the transparency properties system 102 generates the output image 710, the transparency properties system 102 updates the output image 710 in real-time based on the refractive flow scale.

In addition to the above, the transparency properties system 102 also provides an option to save 712. In particular, the transparency properties system 102 generates the output image 710, after the generation of the output image 710, the transparency properties system 102 allows the user of the client device to save the output image 710 to their client device.

Figure 7B:
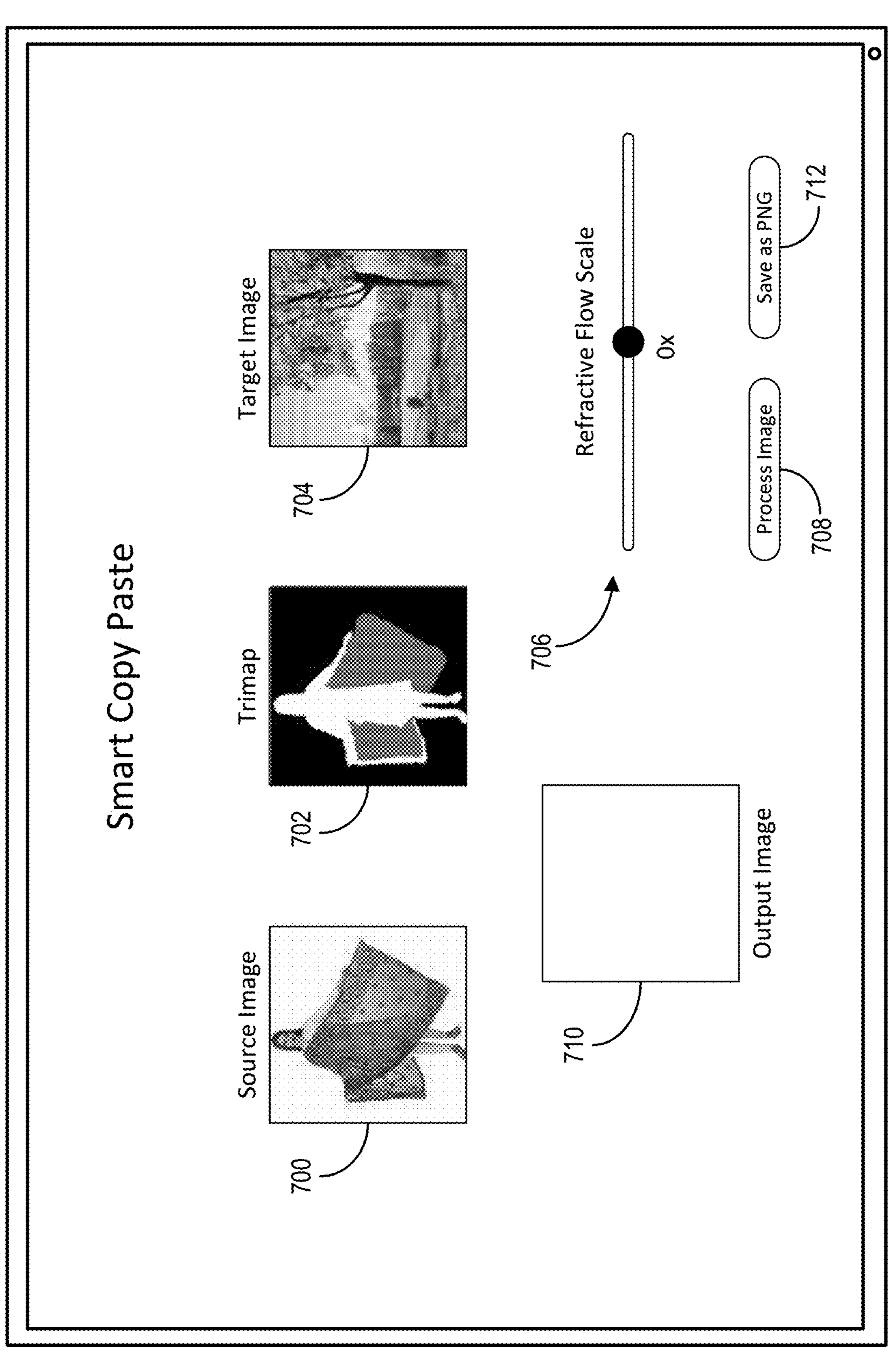

As shown, FIG. 7B illustrates the user of the client device selecting and uploading the source image 700, the trimap 702, and the target digital image 704. As discussed previously, in one or more embodiments, the transparency properties system 102 generates the trimap 702 utilizing a segmentation neural network or from a manual creation by a user of a client device. Once the transparency properties system 102 receives the uploaded source image 700, the trimap 702, and the target digital image 704, the transparency properties system 102 generates the output image 710 in response to a selection of process image 708. Note that FIG. 7B illustrates a source image that depicts a semi-transparent object (e.g., the shawl).

Figure 7C:
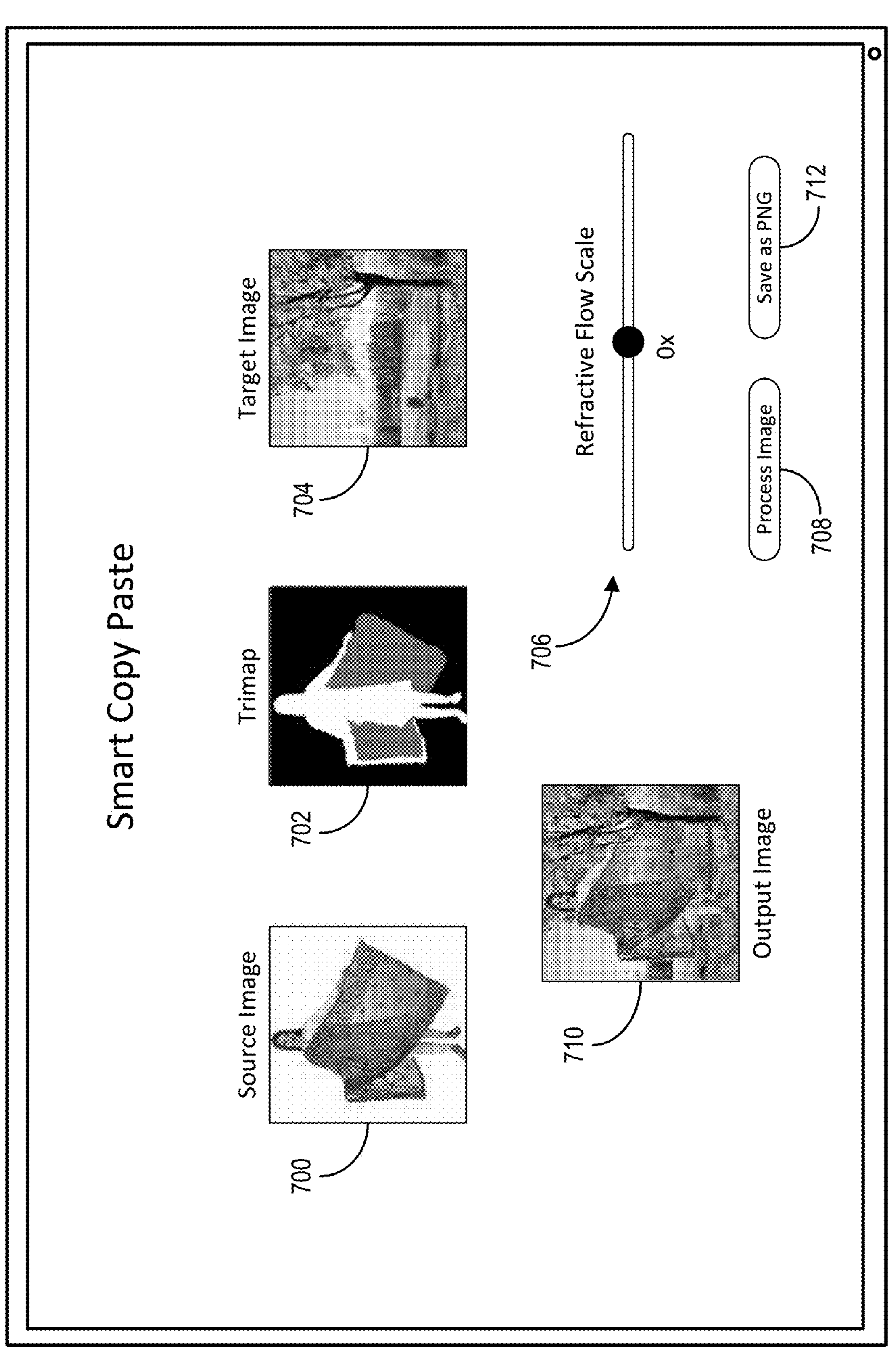
Figure 7D:
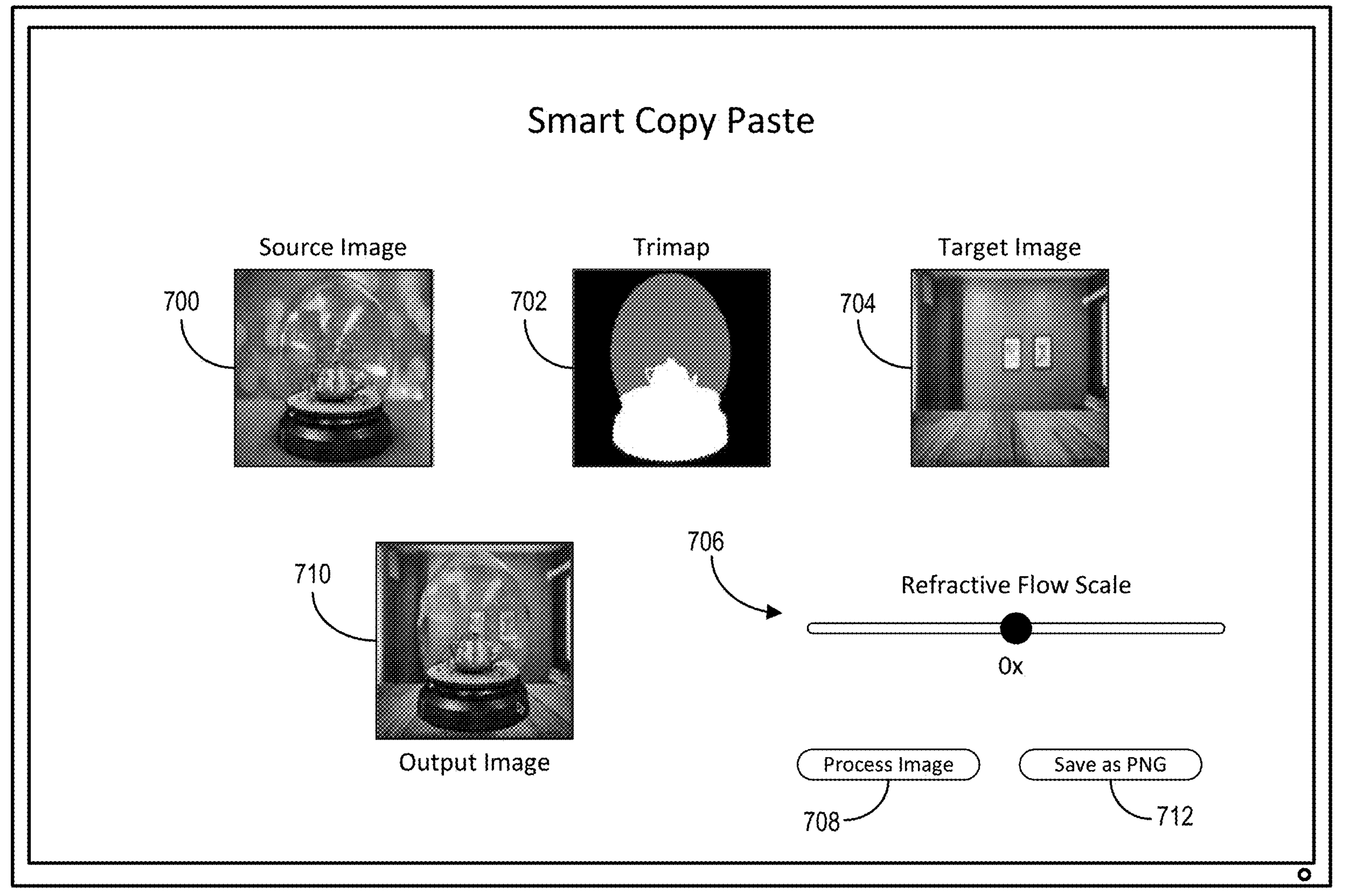

As shown, FIG. 7C illustrates the transparency properties system 102 generating the output image 710 in response to a selection of process image 708. In particular, FIG. 7C shows the semi-transparent object (e.g., the shawl) over the background of a target digital image 704. As shown by FIG. 7C, the transparency properties system 102 maintains the properties (transparency and refractiveness) of the semi-transparent object from the source image 700. Furthermore, FIG. 7D illustrates another example of a transparent object within a digital image placed in the background of a target digital image 704. As already discussed, FIG. 7D further reinforces the improvements of the transparency properties system 102 by illustrating the transparent and refractive properties of the object maintained in the background of a target digital image 704.

Figure 8:
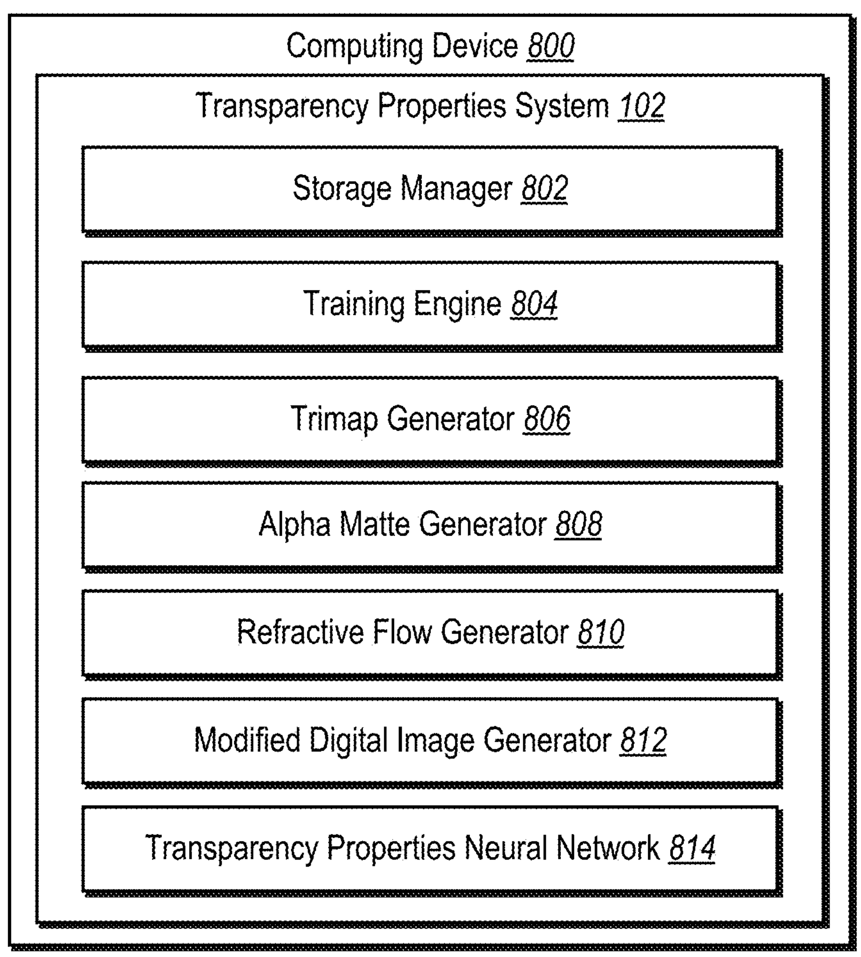
FIG. 8 illustrates an example schematic diagram of the transparency properties system in accordance with one or more embodiments

Turning to FIG. 8, additional detail will now be provided regarding various components and capabilities of the transparency properties system 102. In particular, FIG. 8 illustrates an example schematic diagram of a computing device 800 (e.g., the server(s) 106 and/or the client device 110) implementing the transparency properties system 102 in accordance with one or more embodiments of the present disclosure for components 802-814. As illustrated in FIG. 8, the transparency properties system 102 includes a storage manager 802, a training engine 804, a trimap generator 806, an alpha matte generator 808, a refractive flow generator 810, a modified digital image generator 812, and a transparency properties neural network 814.

The storage manager 802 stores various components such as the first digital image, the trimap, the second digital image, and the modified digital image that are generated or received from digital image editing applications, the trimap generator 806, and the modified digital image generator 812. Furthermore, the storage manager 802 also stores components of the digital image such as the alpha matte and the refractive flow. The transparency properties system 102 utilizes the storage manager 802 and extracts any of the stored components from the storage manager 802 for further utilization.

The training engine 804 trains the transparency properties neural network and the segmentation neural network. The training engine 804 utilizes ground truths of the alpha matte, the refractive flow, and the trimap and to perform acts of comparison. The training engine 804 further modifies parameters of the neural networks based on determined measures of loss.

The trimap generator 806 generates a trimap from a first digital image. Furthermore, the trimap generator 806 generates trimaps of digital images depicting transparent objects. In one or more embodiments, the trimap generator 806 utilizes a segmentation neural network or provides tools for a user of a client device to generate a trimap. The trimap generator 806 also passes along trimaps to the transparency properties neural network for further utilization.

The alpha matte generator 808 generates alpha mattes for pixel values within the first digital image. For example, the alpha matte generator 808 utilizes a transparency properties neural network and generates alpha mattes from the first digital image and a trimap of the first digital image. The alpha matte generator 808 passes on the alpha matte to the transparency properties system 102 for further modifications to the transparent object.

The refractive flow generator 810 generates the refractive flow for remapping pixel values in a background of a target digital image. For example, the refractive flow generator 810 utilizes the transparency properties neural network and generates the refractive flow from the first digital image and the trimap of the first digital image. In doing so, the refractive flow generator 810 passes the refractive flow to the transparency properties system 102 for further utilization, such as remapping pixel values within the background of a target digital image.

The modified digital image generator 812 generates the modified digital image that depicts the transparent object. In one or more embodiments, the modified digital image generator 812 receives the modified transparent object based on the alpha matte and the warped background based on the refractive flow and composites the two to generate the modified digital image depicting the transparent object. Furthermore, the modified digital image generator 812 passes the generated modified digital image to the transparency properties system 102 to provide to a user of the client device.

As described above, the transparency properties neural network 814 includes an encoder and multiple decoders for generating the outputs. In particular, the transparency properties system 102 utilizes the transparency properties neural network 814 to generate the modified digital image. Furthermore, the transparency properties neural network 814 interacts with the training engine 804 and the storage manager 802 to generate outputs.

Each of the components 802-814 of the transparency properties system 102 can include software, hardware, or both. For example, the components 802-814 can include one or more instructions stored on a computer-readable storage medium and executable by processors of one or more computing devices, such as a client device or server device. When executed by the one or more processors, the computer-executable instructions of the transparency properties system 102 can cause the computing device(s) to perform the methods described herein. Alternatively, the components 802-814 can include hardware, such as a special-purpose processing device to perform a certain function or group of functions. Alternatively, the components 802-814 of the transparency properties system 102 can include a combination of computer-executable instructions and hardware.

Furthermore, the components 802-814 of the transparency properties system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 of the transparency properties system 102 may be implemented as a stand-alone application, such as a desktop or mobile application. Furthermore, the components 802-814 of the transparency properties system 102 may be implemented as one or more web-based applications hosted on a remote server. Alternatively, or additionally, the components 802-814 of the transparency properties system 102 may be implemented in a suite of mobile device applications or "apps." For example, in one or more embodiments, the transparency properties system 102 can comprise or operate in connection with digital software applications such as ADOBE® PHOTOSHOP, ADOBE® LIGHTROOM, ADOBE® AFTER EFFECTS, ADOBE® PREMIERE PRO, ADOBE® PREMIERE RUSH, ADOBE SPARK VIDEO, and/or ADOBE® PREMIERE. The foregoing are either registered trademarks or trademarks of Adobe Inc. in the United States and/or other countries.

Figure 9:
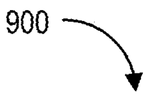
FIG. 9 illustrates a flowchart of a series of acts for generating a modified digital image depicting a transparent object in accordance with one or more embodiments.
Figure 9:
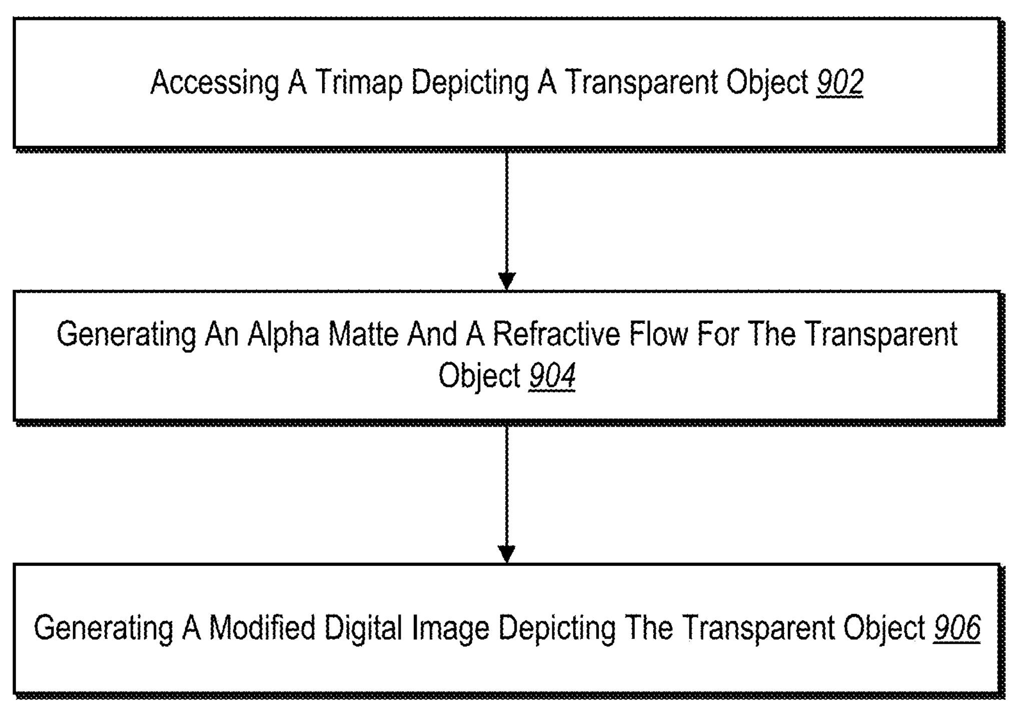

FIGS. 1-8, the corresponding text, and the examples provide a number of different methods, systems, devices, and non-transitory computer-readable media of the transparency properties system 102. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating a modified digital image depicting a transparent object in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device. The system further includes at least one server device configured to cause the system to perform the acts of FIG. 9.

The series of acts 900 includes an act 902 of accessing a trimap depicting a transparent object. The act 902 includes, in one or more embodiments, generating a trimap for a first digital image depicting a transparent object. The act 902 also includes utilizing a segmentation neural network to segment the first digital image into transparent pixels, non-transparent pixels, and background pixels. Alternatively, act 902 includes accessing a trimap generated by a user.

The series of acts 900 also includes an act 904 of generating an alpha matte and a refractive flow for the transparent object. The act 904 includes generating, utilizing a transparency properties neural network, an alpha matte and a refractive flow for the transparent object from the trimap and the first digital image. The act 904 also includes utilizing a dual-head decoder of the transparency properties neural network to decode the feature maps. In particular, this act includes decoding the feature maps by: generating the alpha matte utilizing a first decoder branch of the dual-head decoder and generating the refractive flow utilizing a second decoder branch of the dual-head decoder.

Furthermore, the act 904 includes generating the alpha matte and the refractive flow by utilizing skip connections for encoders of the transparency properties neural network to corresponding decoders. Additionally, this act includes generating the alpha matte utilizing a first activation layer of a first decoder branch and generating the refractive flow utilizing a second activation layer of a second decoder branch, wherein the first activation layer is different than the second activation layer. Additionally, the act 904 includes generating a two-channel vector and wherein generating the two-channel vector comprises generating a horizontal and vertical indication of displacing pixel values within the second digital image. Moreover, the act 904 includes determining a dimension of the second digital image and generating a scaled refractive flow by scaling the refractive flow based on a dimension of the second digital image.

Further, the series of acts 900 includes an act 906 of generating a modified digital image depicting the transparent object. The act 906 includes generating a modified digital image depicting the transparent object within a second digital image by modifying a portion of the second digital image behind the transparent object utilizing the alpha matte and the refractive flow. The act 906 also includes utilizing the scaled refractive flow to remap pixel values in a background of the second digital image. Furthermore, the act 906 includes compositing a warped background of the second digital image with a version of the transparent object modified by the alpha matte.

In one or more embodiments, the acts 900 includes generating, utilizing an encoder of the transparency properties neural network, feature maps of a combination of the first digital image depicting the transparent object and the trimap. Additionally, the acts 900 include generating a scaled refractive flow by scaling the generated refractive flow utilizing a dimension of the second digital image. Further, the acts 900 include generating a warped background of the second digital image by utilizing the scaled refractive flow and generating a version of the transparent object modified by the alpha matte. Moreover, the acts 900 includes compositing the warped background of the second digital image with the version of the transparent object modified by the alpha matte.

Figure 10:
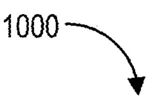
FIG. 10 illustrates a flowchart of a series of acts for generating an alpha matte and a refractive flow in accordance with one or more embodiments.
Figure 10:
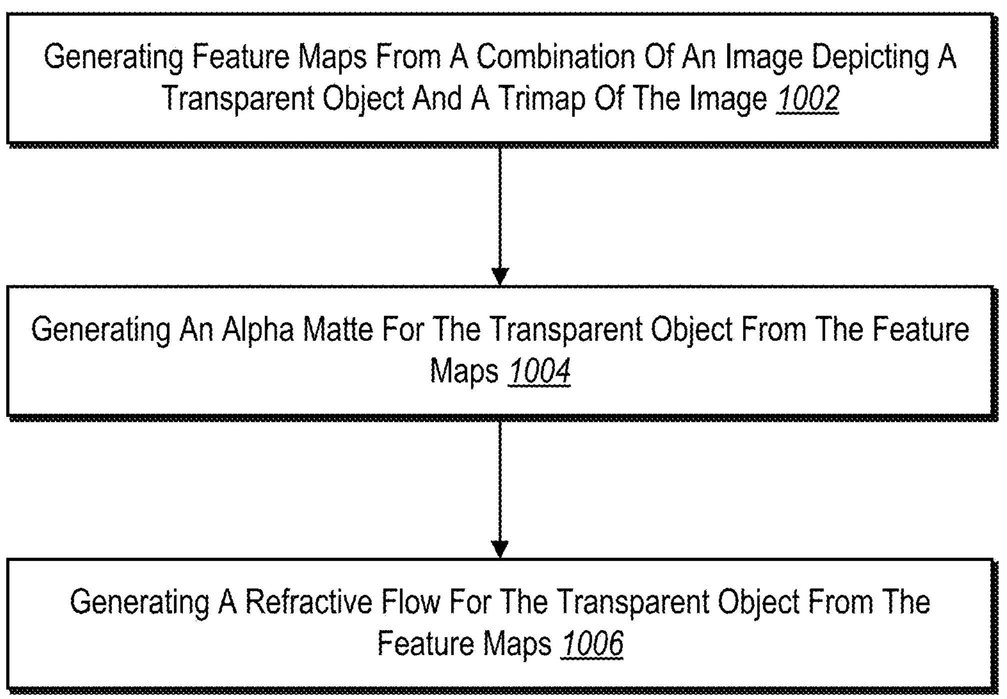

In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for generating an alpha matte and refractive flow in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed as part of a computer-implemented method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device. The system further includes at least one server device configured to cause the system to perform the acts of FIG. 10.

The series of acts 1000 includes an act 1002 of generating feature maps of a combination of an image depicting a transparent object and a trimap of the image. The act 1002 also includes generating, utilizing an encoder of the transparency properties neural network, feature maps of a combination of an image depicting a transparent object and a trimap of the image.

The series of acts 1000 includes an act 1004 of generating an alpha matte for the transparent object from the encoding. The act 1004 includes generating, utilizing a first decoder branch of the transparency properties neural network, an alpha matte for the transparent object from the feature maps.

The series of acts 1000 includes an act 1006 of generating a refractive flow for the transparent object from the feature maps. The act 1006 includes generating, utilizing a second decoder branch of the transparency properties neural network, a refractive flow for the transparent object from the feature maps. The act 1006 also includes generating a two-channel vector comprising a horizontal and vertical indication for displacing pixel values. Further, the act 1006 includes determining a dimension of a second digital image and scaling the refractive flow by utilizing the dimension of the second digital image to generate a scaled refractive flow.

Additionally, the acts 1000 in one or more embodiments includes generating a modified digital image depicting the transparent object in a second digital image by modifying a background of the second digital image utilizing the refractive flow. Moreover, the acts 1000 include remapping pixel values in a background of the second digital image by utilizing the scaled refractive flow. Furthermore, the acts 1000 include generating a modified digital image showing the transparent object within the second digital image by: compositing the remapped background of the second digital image with a version of the transparent object modified by the alpha matte.

In addition to the above, the acts 1000 further include learning parameters of the transparency properties neural network by: determining a measure of loss by comparing the alpha matte with a ground truth alpha matte and modifying the parameters of the transparency properties neural network from the determined measure of loss. Furthermore, the acts 1000 include learning parameters of the transparency properties neural network by: determining a measure of loss. In particular, the measure of loss is determined by comparing a horizontal refractive flow and a vertical refractive flow with a horizontal and vertical ground truth refractive flow and modifying the parameters of the transparency properties neural network from the determined measure of loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
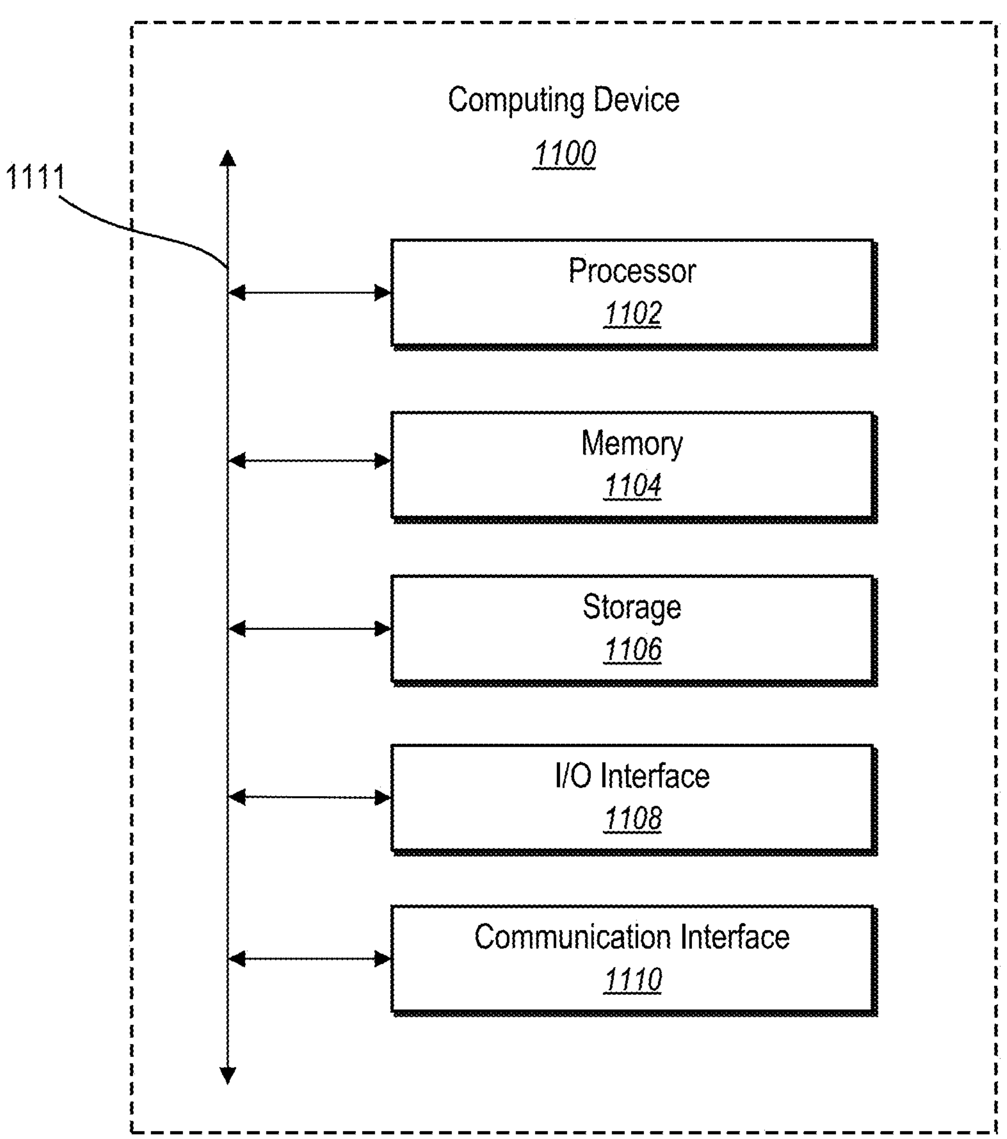
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 106 and/or the client device 110). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1111). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1111. The bus 1111 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

accessing a trimap for a first digital image depicting a transparent object;

generating, utilizing an encoder of a transparency properties neural network, feature maps of a combination of the first digital image depicting the transparent object and the trimap;

generating, utilizing a dual-head decoder of the transparency properties neural network, an alpha matte and a refractive flow for the transparent object based on the trimap and the first digital image by:

generating the alpha matte from the feature maps utilizing a first decoder branch of the dual-head decoder, wherein the alpha matte comprises an alpha matte channel that indicates a graded level of transparency for each pixel value in the transparent object, wherein the transparent object comprises translucent properties that allow for a level of light to pass through the transparent object according to the graded level of transparency; and generating the refractive flow from the feature maps utilizing a second decoder branch of the dual-head decoder; and generating a modified digital image depicting the transparent object within a second digital image by modifying a portion of a background of the second digital image behind the transparent object according to the alpha matte channel for each pixel value in the transparent object as indicated by the graded level of transparency in the alpha matte and according to a level of displacement of pixel values of the transparent object as indicated by the refractive flow.

2. The method of claim 1, wherein generating the modified digital image depicting the transparent object within the second digital image further comprises:

generating a scaled refractive flow by scaling the generated refractive flow utilizing a dimension of the second digital image; and generating a warped background of the second digital image by utilizing the scaled refractive flow.

3. The method of claim 2, further comprising:

generating a version of the transparent object modified by the alpha matte; and compositing the warped background of the second digital image with the version of the transparent object modified by the alpha matte.

4. The method of claim 1, wherein accessing the trimap further comprises utilizing a segmentation neural network to segment the first digital image into transparent pixels, non-transparent pixels, and background pixels.

5. The method of claim 1, wherein generating the alpha matte and the refractive flow further comprises:

generating the alpha matte and the refractive flow by utilizing skip connections for encoders of the transparency properties neural network to corresponding decoders by:

generating the alpha matte utilizing a first activation layer of the first decoder branch; and generating the refractive flow utilizing a second activation layer of the second decoder branch, wherein the first activation layer is different than the second activation layer.

6. The method of claim 1, wherein:

generating the refractive flow comprises generating a two-channel vector; and generating the two-channel vector comprises generating a horizontal and vertical indication of displacing pixel values within the second digital image.

7. The method of claim 1, wherein generating the refractive flow further comprises:

determining a dimension of the second digital image; and generating a scaled refractive flow by scaling the refractive flow based on the dimension of the second digital image.

8. The method of claim 7, wherein generating the modified digital image depicting the transparent object within the second digital image further comprises utilizing the scaled refractive flow to remap pixel values in a background of the second digital image.

9. The method of claim 1, wherein generating the modified digital image depicting the transparent object within the second digital image further comprises compositing a warped background of the second digital image with a version of the transparent object modified by the alpha matte.

10. A system comprising:

one or more memory components comprising a transparency properties neural network; and one or more computer processing devices coupled to the one or more memory components, the one or more computer processing devices to perform operations comprising utilizing a dual-head decoder of the transparency properties neural network to decode feature maps by:

accessing a trimap of an image depicting a transparent object;

generating, utilizing an encoder of the transparency properties neural network, the feature maps of a combination of the image depicting the transparent object and the trimap of the image;

generating, utilizing a first decoder branch of the dual-head decoder of the transparency properties neural network, an alpha matte for the transparent object from the feature maps;

generating, utilizing a second decoder branch of the dual-head decoder of the transparency properties neural network, a refractive flow for the transparent object from the feature maps; and generating a modified digital image depicting the transparent object within an additional digital image by modifying a portion of the additional digital image behind the transparent object utilizing the alpha matte and the refractive flow.

11. The system of claim 10, wherein the operations further comprise generating the modified digital image depicting the transparent object in the additional digital image by modifying a background of the additional digital image utilizing the refractive flow.

12. The system of claim 11, wherein generating the refractive flow further comprises generating a two-channel vector comprising a horizontal and vertical indication for displacing pixel values.

13. The system of claim 10, wherein generating the refractive flow further comprises:

determining a dimension of the additional digital image; and scaling the refractive flow by utilizing the dimension of the additional digital image to generate a scaled refractive flow.

14. The system of claim 13, wherein the operations further comprise remapping pixel values in a background of the additional digital image by utilizing the scaled refractive flow.

15. The system of claim 14, wherein the operations further comprise:

generating the modified digital image showing the transparent object within the additional digital image by:

compositing the remapped background of the additional digital image with a version of the transparent object modified by the alpha matte.

16. The system of claim 10, wherein the operations further comprise learning parameters of the transparency properties neural network by:

determining a measure of loss by comparing the alpha matte with a ground truth alpha matte; and modifying the parameters of the transparency properties neural network from the determined measure of loss.

17. The system of claim 10, wherein the operations further comprise learning parameters of the transparency properties neural network by:

determining a measure of loss by comparing a horizontal refractive flow and a vertical refractive flow with a horizontal and vertical ground truth refractive flow; and modifying the parameters of the transparency properties neural network from the determined measure of loss.

18. A non-transitory computer-readable medium storing executable instructions which, when executed by at least one processing device, cause the at least one processing device to perform operations comprising:

generating a trimap for a first digital image depicting a transparent object by utilizing a segmentation neural network to segment the first digital image into transparent pixels, non-transparent pixels, and background pixels;

generating, utilizing a transparency properties neural network, an alpha matte and a refractive flow for the transparent object from the trimap and the first digital image; and generating a modified digital image depicting the transparent object within a second digital image by modifying a portion of the second digital image behind the transparent object utilizing the alpha matte and the refractive flow.

19. The non-transitory computer-readable medium of claim 18, wherein generating the modified digital image depicting the transparent object within the second digital image further comprises:

generating a scaled refractive flow by scaling the generated refractive flow utilizing a dimension of the second digital image; and generating a warped background of the second digital image by utilizing the scaled refractive flow.

20. The non-transitory computer-readable medium of claim 19, wherein generating the modified digital image depicting the transparent object within the second digital image further comprises:

generating a version of the transparent object modified by the alpha matte; and compositing the warped background of the second digital image with the version of the transparent object modified by the alpha matte.

* * * * *